(12) United States Patent
Akay et al.

(10) Patent No.: US 7,780,854 B2
(45) Date of Patent: Aug. 24, 2010

(54) METHODS FOR SEPARATING OIL AND WATER

(76) Inventors: Galip Akay, School of Chemical Engineering and Advanced Materials, Newcastle University, Newcastle upon Tyme (GB) NEI 7RU; John Vickers, British Nuclear Fuels plc, Building B170, Sellafield, Seascale, Cumbria (GB) CA20 1PG ( * ) Notice: Subject to any disclaimer, the term of this patent is extended or adjusted under 35 U.S.C. 154(b) by 727 days.

(21) Appl. No.: 10/333,769

(22) PCT Filed: Jul. 30, 2001

(86) PCT No.: PCT/GB01/03412

§ 371 (c)(1),
(2), (4) Date: Sep. 11, 2003

(87) PCT Pub. No.: WO02/10070

PCT Pub. Date: Feb. 7, 2002

(65) Prior Publication Data

US 2005/0045564 A1   Mar. 3, 2005

(30) Foreign Application Priority Data

Jul. 29, 2000   (GB) ................................ 0018573

(51) Int. Cl.
*B01D 17/05* (2006.01)
(52) U.S. Cl. ................. 210/708; 208/188; 516/136; 516/143; 516/197; 210/732; 210/738

(58) Field of Classification Search ............... 210/634, 210/708, 732, 748, 774, 787, 806, 263, 264, 210/511, 738; 208/187, 188; 516/135, 136, 516/139–146, 194–197; 521/61–64; 423/2, 423/6–11
See application file for complete search history.

(56) References Cited

U.S. PATENT DOCUMENTS

| 4,120,815 | A | * | 10/1978 | Raman ..................... 516/172 |
| 4,126,551 | A | * | 11/1978 | Cognevich ............... 210/776 |
| 4,160,742 | A | * | 7/1979 | Raman ..................... 516/172 |
| 4,759,913 | A | * | 7/1988 | Headington ............... 423/10 |
| 4,968,449 | A | * | 11/1990 | Stephenson ............... 516/189 |

(Continued)

FOREIGN PATENT DOCUMENTS

| WO | WO 96/20270 A1 | | 7/1996 |
| WO | WO 97/19347 A1 | | 5/1997 |
| WO | WO 00/00143 | * | 1/2000 |
| WO | WO 00/04970 A1 | | 2/2000 |
| WO | WO 00/34454 A2 | | 6/2000 |

OTHER PUBLICATIONS

Akay, G., "Flow-induced phase inversion in the intensive processing of concentrated emulsions", Chemical Engineering Science, vol. 53, No. 2, pp. 203-223, 1998.

*Primary Examiner*—Joseph W Drodge
(74) *Attorney, Agent, or Firm*—Garvey, Smith, Nehrbass & North, L.L.C.; Seth M. Nehrbass; Vanessa M. D'Souza

(57) ABSTRACT

The present invention relates to methods for the separation of oil and water, in particular through the action of a polymeric material on oil/water emulsions (including oil-in-water and water-in-oil emulsions).

11 Claims, 18 Drawing Sheets

U.S. PATENT DOCUMENTS

| | | |
|---|---|---|
| 5,021,167 A | 6/1991 | Braden et al. |
| 5,032,285 A | 7/1991 | Braden et al. |
| 5,100,582 A | 3/1992 | Bhattacharyya |
| 5,195,847 A * | 3/1993 | Guymon .................. 405/128.7 |
| 5,900,437 A * | 5/1999 | Mitchell et al. ............... 521/64 |
| 6,395,184 B1 * | 5/2002 | Bukhtiyarov et al. ....... 210/669 |

* cited by examiner

SEM micrographs of hydrophobic rigid PHP. Magnification 500

SEM micrographs of a S- PHP. Magnification 500

SEM micrographs of hydrophilic (sulphonated) rigid PHP soaked in raw crud overnight, magnification (3a) 500, (3b) 2000 (lesser deposited region in (3a)

Performance of the original (hydrophobic) rigid PHP in the demulsification of the crude Comparison of the demulsification performance of PHP (hydrophobic and hydrophilic) with respect to that of 0.45 μm pore size membrane (total demulsification)

PHP washed with methanol and then water after being used in demulsification

Performance of the sulphonated (hydrophilic) rigid PHP in the demulsification of the crude SEM micrographs of the sediments formed in the aqueous phase during the demulsification of crud by hydrphilic PHP, magnification (3a) 2000, (3b) 5000

EDAX spectrums of the sediments formed in the aqueous phase during the demulsification of crud by S-PHP-Na EDAX spectrums of the sediments formed in the aqueous phase during the demulsification of crud by S-PHP-Na SEM micrographs of the S-PHP-Na particles remained in the crud phase after the first demulsification, magnification (10a) a particle, (10b) another particle

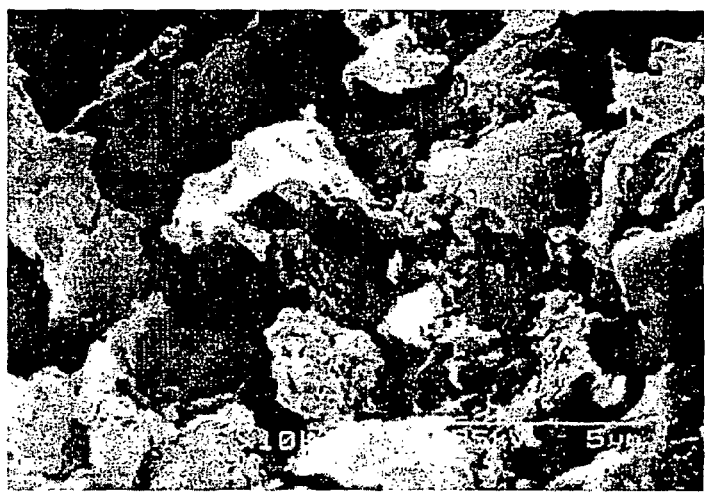
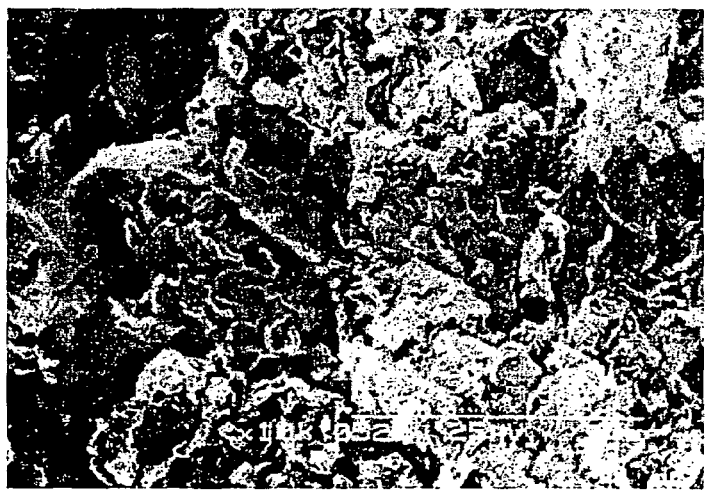
SEM micrographs of typical remaining crud solids following demulsification by S-PHP-Na. Washed by (11a) water, (11b) ethanol, and (11c) dichloromethane followed by hexane

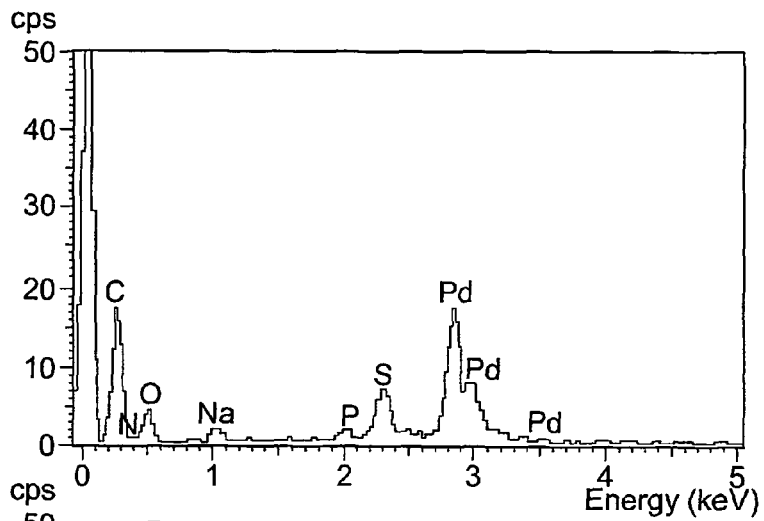
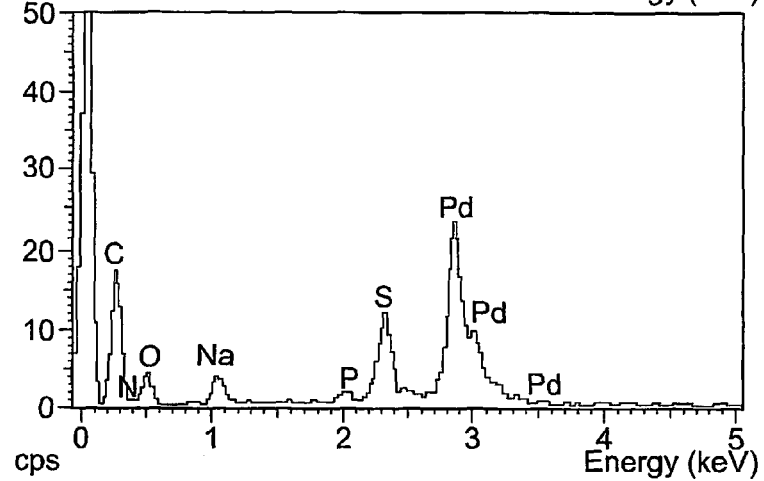
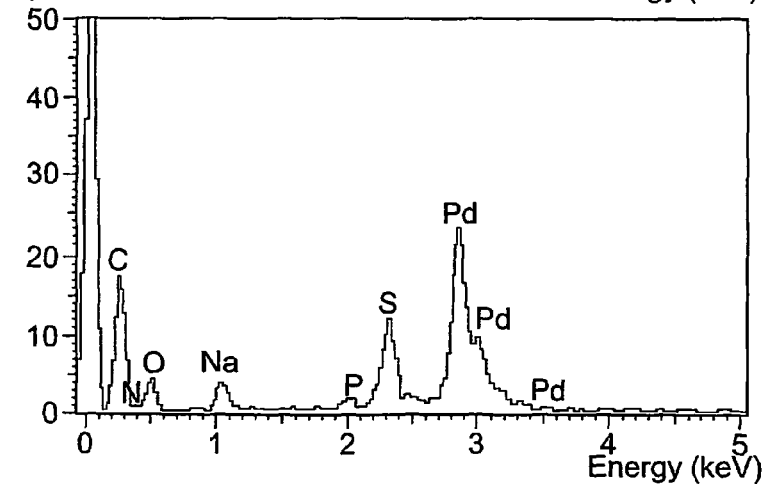
EDAX spectrums of typical remaining crud solids following the demulsification by S-PHP-Na. Washed by (12a) water, (12b) ethanol, and (12c) dichloromethane followed by hexane Chemical content of some typical crud solids, (13a) for palladium and phosphorous, (13b) for nitrogen, carbon and hydrogen. MSOC: Membrane Separated Original Crud, DCMWOC: Dicholoromethane Washed Original Crud, EWOC: Ethanol Washed Original Crud, WWRC: Water Washed Remaining Crud, DCMWRC: Dicholoromethane Washed Remaining Crud, EWRC: Ethanol Washed Remaining Crud SEM micrographs of the hydrophilic PHP particles remained in the crud phase after demulsification of the remaining crud from the first demulsification, magnification (14a) 500, (14b) 2000

SEM micrographs of very fine crud particles,
magnification (15a) 500, (15b) 5000

EDAX spectrums very fine crud particles. The total area in Fig. 12a

EDAX spectrums very fine crud particles. Bright area shown in Fig. 12a

Effect of the degree of the sulphonation for varying type of crud and the ratio of mass of PHP to the total volume of initial tube content ($M_{PHP}/V_T$)

Effect of S-PHP-Na mass on the aqueous phase separation as function of time. Legend shows the mass in gram Effect of the degree of the sulphonation as function of time on the demulsification of crud. Legend shows the degree of the sulphonation Effect of the mixture of S-PHP-Na and PHP as function of time on the demulsification of crud. S-PHP-Na = 0.06g, mass of PHP is given in legend in gram Some typical results of the tests on the treatment of degraded solvent phase and spent aqueous phase by commercially available absorbent and ion-exchange materials

METHODS FOR SEPARATING OIL AND WATER

The present invention relates to methods for the separation of oil and water, in particular through the action of a polymeric material on oil/water emulsions (including oil-in-water and water-in-oil emulsions).

The separation of oil and water is an established process which, however, suffers from certain limitations. For example, North Sea crude oil is extracted from undersea deposits as a foamy emulsion that is typically 80% water and may include other impurities like metal ions and unwanted organic compounds. Depending on the nature of any surfactants present, the viscosity of the oil, the phase volume of the dispersed water and its droplet size, current processes may not be able to separate the oil and water phases. The known processes are also intended exclusively for land based operations and hence separation on the sea bed or even on the oil platform presents difficulties regarding the availability of space and sufficiently robust technology capable of operating at sub-sea or downhole conditions. The environmental impact and the capital and operating costs of oil extraction can be reduced by sub-sea separation of oil and water. This has the additional benefit of enhancing the separation process by virtue of a high crude temperature before it is pumped to the oil platform, since by the time it has reached the platform the crude temperature falls rapidly thus reducing the ease of separation of oil and water. The integration of oil/water separation with produced water treatment can reduce the environmental impact of crude oil extraction as well as reducing the capital and operating costs of crude production.

Other industries where the demulsification and separation of oil/water emulsions is required include pharmaceutical manufacture, chemical manufacture, biotechnology, the nuclear fuel cycle industry and many more.

Various methods of demulsification and separation have been proposed. Some emulsions can be separated merely by allowing them to settle, but this generally takes an unacceptably long period of time, sometimes even several years. Spinning or centrifuging can speed up this process, but generally not by a great extent.

According to a first aspect of the present invention, there is provided a method for demulsifying and/or separating an oil/water emulsion, wherein the emulsion is contacted with a polymerised High Internal Phase Emulsion (polyHIPE) material.

According to a second aspect of the present invention, there is provided a use of a polymerised High Internal Phase Emulsion (polyHIPE) material for demulsifying and/or separating an oil/water emulsion.

For the avoidance of doubt, the expression "water" as used herein encompasses all aqueous systems, "oil" encompasses all immiscible with aqueous systems, and "oil/water emulsion" encompasses oil-in-water and water-in-oil emulsions and other similar emulsions.

The polyHIPE material can be recovered and recycled after the emulsion has been separated. In addition to the removal of any indigenous surface-active materials (such as organic carboxylates, asphaltenes, phosphates, oxides and the like) which tend to stabilise emulsions, the polyHIPE material also removes from the aqueous phase metal ions (including nano-sized organo-metallic clusters) and residual hydrocarbons. Hydrocarbon (including alkyl phenols) concentration reduction can be further enhanced (to the levels of around 0.5 ppm) by the use of a hydrophobic form of the polyHIPE material which can also be recovered and chemically treated to re-obtain the starting hydrophobic material. Therefore, the oil-water separation process can be integrated with production water cleaning (both residual hydrocarbons and metal ion removal) which can be discharged into, for example, the sea with little environmental impact.

According to a third aspect of the present invention, there is provided a method for the continuous demulsification and/or separation of an oil/water emulsion, wherein the emulsion is contacted with a polymerised High Internal Phase Emulsion (polyHIPE) material and subjected to at least one further process selected from the group comprising: application of an electric field, application of heat, application of pressure, flow induced phase inversion, centrifugation, and passage across a rotating surface.

According to a fourth aspect of the present invention, there is provided an apparatus for demulsifying and/or separating an oil/water emulsion, the apparatus including a component adapted to receive the emulsion and formed of or containing a polymerised High Internal Phase Emulsion (polyHIPE) material.

An integrated demulsification and water cleaning process can be achieved by using existing separation technology (in the form of hydrocyclones). However, for offshore oil-water separation and water cleaning, a novel, intensified process is needed to address the problems of space availability and proximity to the source of the crude oil (i.e., sub-sea or down hole separation and cleaning are desirable). This can be achieved by the intensification of the process using continuous demulsification and cleaning processes. The intensive demulsification can be achieved by utilising the flow induced phase inversion phenomenon. For this purpose, a novel rotating disk contactor (crude oil-water and demulsifier contact) is proposed where several other demulsification fields (such as flow field, electrical field and pressure) can be superimposed. The ultimate aim of these systems is to develop sub-sea or down hole separation and where needed water cleaning.

The present invention therefore addresses two important problems: the reduction of the environmental impact of crude oil extraction and the simplification of drilling technology and subsequent down stream operations by eliminating production water at source and removing surface active species.

PolyHIPE materials are obtained through the polymerisation of a High Internal Phase Emulsion (HIPE) in which a continuous phase contains polymerisable components of the emulsion. PolyHIPE materials have a micro-cellular and highly porous structure, and can be produced in the form of particles, powders, fibres (including hollow fibres), monolithic structures (such as moulded separation modules or shell-and-tube type structures) or membranes, including hollow fibre membranes and membranes in crossflow filtration configurations. In a typical polyHIPE polymer, styrene or styrene/2-ethyl hexyl acrylate (2-EHA) is used as the polymerising constituent, but other constituents, for example styrene-divinyl benzene, may be used as is well known in the art. PolyHIPE materials are generally initially hydrophobic but may be sulphonated, for example by contact with sulphuric acid, to make them hydrophilic. Such sulphonated polyHIPE materials may therefore be used as ion exchange media which due to their highly open pore structure have a very high rate of ion exchange compared to conventional ion exchange resins.

Various polyHIPE materials and methods for their manufacture are described in European patent application 0 060 138, the full disclosure of which is incorporated into the present application by reference. It will be noted that the polyHIPE materials of EP 0 060 138 are discussed solely in terms of their ability to retain a liquid, acting rather like sponges.

Some polyHIPE materials which have been investigated by the present applicant and methods for the production thereof are described in detail in Akay, G, Bhumgara, Z and Wakeman, R J, *Self-supported Porous Channel Filtration Modules: Preparation, Properties and Performance*, Chem Eng Res Design 73 (1995) 783-796, the full disclosure of which is incorporated into the present application by reference.

The void volume of the polyHIPE materials investigated by the present applicant can be as high as 98%, and the pore size can be controlled accurately from hundreds of micrometers to fractions thereof, as described for example in the present applicant's International patent application WO 00/34454, the full disclosure of which is incorporated into the present application by reference.

PolyHIPE materials suitable for use with the present invention may be elastic or rigid depending on the type and proportion of monomers used in the oil phase of the HIPE, and they may be hydrophobic or hydrophilic.

Suitable polyHIPE polymers may be prepared by using the methods described in detail in WO 00/34454. The specific properties of polyHIPE polymers can chosen from a wide range by appropriate manufacturing techniques and may therefore be tailored to specific applications with relative ease. Three types of polyHIPE polymer can be used depending on the surfactant system present in the emulsion to be demulsified and separated:

1. Hydrophobic (mainly styrene based homo- or co-polymers)—this is the basic polymer which can be modified to obtain the following ionic co-polymers.
2. Anionic/non-ionic (the degree of each group can be changed).
3. Cationic/non-ionic (the degree of each group can be changed).

These micro-porous polymers can be obtained in bulk or in powder or granular form. The internal architecture of the polymers can also be tailored by controlling the pore size, the interconnecting hole size, the phase volume of the polymer which is usually 5-20% and the secondary porosity of the walls which can be nano-sized.

The pore size (D) of the polymer can be in the range of $0.5 \,\mu m \leq D \leq 500 \,\mu m$ while the ratio of the interconnect size (d) to pore size (D) can be in the range of $0 \leq d/D \leq 0.5$. Experiments summarised in the present application were conducted using particulate (powder) form with a pore size of $D \approx 10 \,\mu m$ and $d \approx 0.3 \,\mu m$.

In order to demulsify an oil/water emulsion, all that is necessary is to contact the emulsion with a suitable polyHIPE polymer. The polymer may be added in powder or granular form, in which case it has been found that the addition of 0.3 g per kilogram of emulsion is effective, although a range of 0.05 g to 5 g of polymer per kilogram of emulsion is effective, with a range of 0.1 g to 1 g of polymer per kilogram of emulsion being particularly advantageous. The present applicant has found, surprisingly, that the addition of larger amounts of polymer tends to slow down the demulsification and separation process. It is believed that this is due to the excess polymer absorbing too much water from the emulsion.

Simultaneous demulsification and separation of oil/water phases can be achieved by contacting the emulsion with hydrophobic or hydrophilic surfaces followed by the removal of oil and water from the demulsification zone. Demulsification can be enhanced by the application of an electric field in which water droplet-droplet contact is enhanced leading to coalescence and subsequent separation under gravity. In both cases the target phase is the dispersed droplets in which the droplet coalescence is promoted.

In some embodiments, the intensive demulsification method of the present invention targets the removal in the first instance of surface-active materials present in the emulsion thus causing destabilisation. In order to achieve this selective removal of the surface-active species, it is advantageous to use polyHIPE polymers which have both hydrophobic and hydrophilic sites close to each other at a molecular scale. In order to immobilise the surface-active species, the 'active' surface area of the microporous polyHIPE polymer should be high and accessible. Furthermore, recent studies by the applicant indicate that the behaviour of surfactant phases in the nicro-pores of polyHIPE polymers is remarkably different compared with their bulk behaviour, which is believed to explain why particular types of micro-porous polyHIPE materials are so effective in the intensification of oil/water separation. Non-porous polymers with the same chemical structure do not cause any separation.

There is some evidence that microporous polyHIPE polymers create internal flows due to capillary pressure. The flow effects can also lead to phase inversion, called Flow Induced Phase Inversion in emulsions, as discussed by Akay, G, Chem Eng Sci., 53, (1998) 203-223, the full disclosure of which is incorporated into the present application by reference. During phase inversion, the emulsion goes through a co-continuous activated state and this may also cause phase separation in the presence of hydrophilic and hydrophobic regions of the polyHIPE polymer. It is therefore possible to enhance the separation further by using a continuous flow demulsification process in which an emulsion is forced through a polyHIPE component, for example a membrane, packed bed, hollow fibres etc.

In a continuous oil-water separation process, many of the known oil-water separation processes can be combined with the demulsification method of the first aspect of the present invention to obtain a continuous intensified process. Known oil-water separation processes include: (i) electric field intensification, (ii) Control Deformation Dynamic Mixer (CDDM) technology, (iii) flow induced phase inversion, (iv) high ambient pressure and temperature, and (v) fractionation of oil (including crude oil) during oil-water separation.

Central to this intensified continuous process is the CDDM technology as described by Akay et al. in International patent application WO 96/20270, the full disclosure of which is incorporated into the present application by reference. The CDDM can be further modified to have a facility for applying an electric field and in-situ flow induced phase inversion, demulsification and phase disengagement in the presence of a micro-porous polyHIPE demulsifier. When demulsification is to be further enhanced, the flow induced phase inversion should not cause the formation of very small oil droplets. Therefore the flow geometry of the CDDM is important in achieving a phase inversion in the presence of micro-porous polyHIPE demulsifier.

Since the efficiency of the polyHIPE demulsifier is dependent on the emulsion type (most probably due to the viscosity of the oil phase) it may be possible to fractionate the oil at the oil-water separation stage. In all cases, powdered or granular demulsifier can be mixed with the crude oil emulsion at high pressure by dispersing the powder or granules into an organic phase (light crude, for example). Injection of the demulsifier can be at several suitable points in the process stream.

Embodiments of the present invention are particularly suited to the demulsification of interfacial crud (IFC) in the nuclear energy and reprocessing industries.

In the reprocessing of spent nuclear fuel, recovery of fissionable materials, mainly uranium and plutonium, is performed by solvent extraction. Among existing processes, the most widely used is the PUREX process or thermal oxide reprocessing (THORP), in which the spent fuel is dissolved in 3M to 6M nitric acid. Dissolved heavy metals are extracted using an organic solvent, usually a 30% (by volume) solution of tri-n-butylphosphate (TBP; extractant) in normal paraffin hydrocarbon (diluent), n-dodecane or odourless kerosene (OK; mainly dodecane with other alkanes $C_nH_{2n+1}$; $9 \leqq n \leqq 12$).

In the PUREX process, both the extractant and the diluent are gradually degraded to radiolysis products, including surface active materials which then form emulsions. These emulsions can be identified when the extractant and diluent mixture is allowed to rest, the emulsions appearing at the interface between the organic and aqueous phases. These emulsions are referred to as interfacial crud (IFC) which can also contain colloidal solids. IFC is thought to be either a water-in-oil or an oil-in-water emulsion, but may also be a multiple emulsion such as (oil-in-water)-in-oil and/or (water-in-oil)-in-water. Although the amount of IFC generated tends to be small, it nevertheless causes problems in the extraction of fissionable products due to decreased mass transfer and clogging of extraction and transport equipment. For effective operation of the PUREX process, it is therefore desirable to prevent the formation of IFC or to break down any IFC formed. IFC may be skimmed off or otherwise removed before or during the solvent extraction process and taken to a separate container or the like where demulsification and/or emulsion separation may take place. Alternatively, demulsification and/or emulsion separation of the IFC may take place at the same time as the solvent extraction process.

According to a fifth aspect of the present invention, there is provided a method for demulsifying and/or separating an interfacial crud emulsion generated during the reprocessing of nuclear fuel, wherein the emulsion is contacted with a polymerised High Internal Phase Emulsion (polyHIPE) material.

According to a sixth aspect of the present invention, there is provided a use of a polymerised High Internal Phase Emulsion (polyHIPE) material for demulsifying and/or separating an interfacial crud emulsion generated during the reprocessing of nuclear fuel.

According to a seventh aspect of the present invention, there is provided a method for the continuous demulsification and/or separation of an interfacial crud emulsion generated during the reprocessing of nuclear fuel, wherein the emulsion is contacted with a polymerised High Internal Phase Emulsion (polyHIPE) material and subjected to at least one further process selected from the group comprising: application of an electric field, application of heat, application of pressure, flow induced phase inversion, centrifugation, and passage across a rotating surface.

According to an eighth aspect of the present invention, there is provided an apparatus for demulsifying and/or separating an interfacial crud emulsion generated during the reprocessing of nuclear fuel, the apparatus including a component adapted to receive the emulsion and formed of or containing a polymerised High Internal Phase Emulsion (polyHIPE) material.

PolyHIPE materials suitable for use with these, as well as the foregoing, aspects of the present invention may have a void volume as high as 98% with pore sizes in the range of hundreds of micrometres down to fractions of micrometres. The polyHIPE material may be elastic or rigid depending on the type and proportion of monomers used in the oil phase. The polyHIPE materials may be hydrophobic or hydrophilic. In one preferred embodiment, a continuous oil phase of a High Internal Phase Emulsion for the production of a rigid polyHIPE material is made from a mixture of styrene with divinyl benzene (DVB) as a cross-linking agent and a water-in-oil emulsifier (surfactant) Span 80. A typical oil phase composition is styrene 78%, divinyl benzene 8% and Span 80 14% (all by volume). For an elastic polyHIPE material, the oil phase may comprise styrene 15%, 2-ethyl hexyl acrylate (2-EHA) 60%, divinyl benzene 10% and Span 80 15% (all by volume). The dispersed aqueous phase may comprise a solution of polymerisation initiator, potassium persulphate (0.5% by mass), in double distilled water.

In order to produce a typical polyHIPE material, sufficient quantity of aqueous phase is dosed into the stirred oil phase until an aqueous to oil phase ratio of 90:10 (by volume) is achieved, over a period of about 10 minutes to form a HIPE. The HIPE may be stirred for a further period of time, e.g. 20 minutes, before being poured into a mould or the like. The HIPE may then be polymerised in an oven at 60° C. overnight to become polyHIPE and then dried, before being cut into appropriately sized pieces (e.g. 1 cm cubes). The polyHIPE pieces may be washed free of surfactant with isopropyl alcohol or the like and water, and then re-dried.

PolyHIPE may be sulphonated so as to make it hydrophilic. The polyHIPE pieces may be soaked in 98% (by mass) concentrated sulphuric acid at temperatures of 20 to 90° C. for varying times so as to achieve varying degrees of sulphonation. The pieces may then be washed free of excess acid and dried before being subjected to titrimetric analysis in order to determine the degree of sulphonation. This is possible because sulphonated polyHIPE becomes acidic as $-SO_3^-H^+$ groups become attached to benzene rings of any crosslinked polystyrene chains present. If the degree of sulphonation is expressed as a percentage of available benzene rings in the polymer structure which can attain $-SO_3^-H^+$ groups, it can therefore be measured by titrimetric analysis. The hydrophilicity of a polyHIPE material may therefore be tailored to any particular application by adjusting the degree of sulphonation.

During sulphonation, the internal porous structure of polyHIPE materials is etched by the acid, leading to enlargement of the pores and the formation of new, smaller pores within existing cell walls.

It is further to be noted that alkali salts of the polyHIPE material can be prepared through contact with aqueous alkali solutions after the sulphonation process. This causes an exchange between protons in $-SO_3^-H^+$ groups and positively charged ionic species of the alkalis.

A sodium salt of polyHIPE material (neutralised polyHIPE) may be prepared by soaking polyHIPE samples in, say, 2M sodium hydroxide.

IFC may be demulsified by way of the present invention in either batch or continuous mode.

According to a ninth aspect of the present invention, there is provided a method of demulsifying and/or separating an oil/water emulsion, comprising the steps of:

i) supplying the emulsion to a rotating surface of a rotating surface reactor;

ii) operating the rotating surface reactor so that the rotating surface spins at a speed sufficient to cause the solution to spread over the rotating surface as a continuously flowing thin film;

iii) contacting the emulsion on the rotating surface with a polymerised High Internal Phase Emulsion (polyHIPE) material so as to cause demulsification and/or separation of the emulsion.

Separated aqueous and organic phases from the demulsified or separated emulsion may be thrown from a periphery of the rotating surface and collected, as may the polyHIPE material. The polyHIPE material may be processed and recycled.

The emulsion may be a crude oil emulsion, interfacial crud or any other type of emulsion.

Rotating surface reactors suitable for use with this aspect of the present invention are described in the present applicant's co-pending International patent applications PCT/GB0000519, PCT/GB0000521, PCT/GB00523, PCT/GB00/524; PCT/GB0000526 and PCT/GB01/00634, the full disclosures of which are hereby incorporated into the present application by reference. Rotating surface reactors may be in the form of spinning disc reactors, spinning cone reactors and other shaped reactors as discussed in the above patent applications.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 11a shows SEM micrographs of typical remaining crud solids following demulsification by S-PHP-NA, washed by water;

FIG. 11b shows SEM micrographs of typical remaining crud solids following demulsification by S-PHP-NA, washed by ethanol;

FIG. 11c shows SEM micrographs of typical remaining crud solids following demulsification by S-PHP-NA, washed by dichloromethane followed by hexane;

FIG. 12a shows EDAX spectrums of typical remaining crud solids following demulsification by S-PHP-NA, washed by water;

FIG. 12b shows EDAX spectrums of typical remaining crud solids following demulsification by S-PHP-NA, washed by ethanol;

FIG. 12c shows EDAX spectrums of typical remaining crud solids following demulsification by S-PHP-NA, washed by dichloromethane followed by hexane;

FIG. 16a shows EDAX spectrums very fine crud particles, the total area in FIG. 12a;

FIG. 16b shows EDAX spectrums very fine crud particles, the bright area shown in FIG. 12a;

Figure 1:
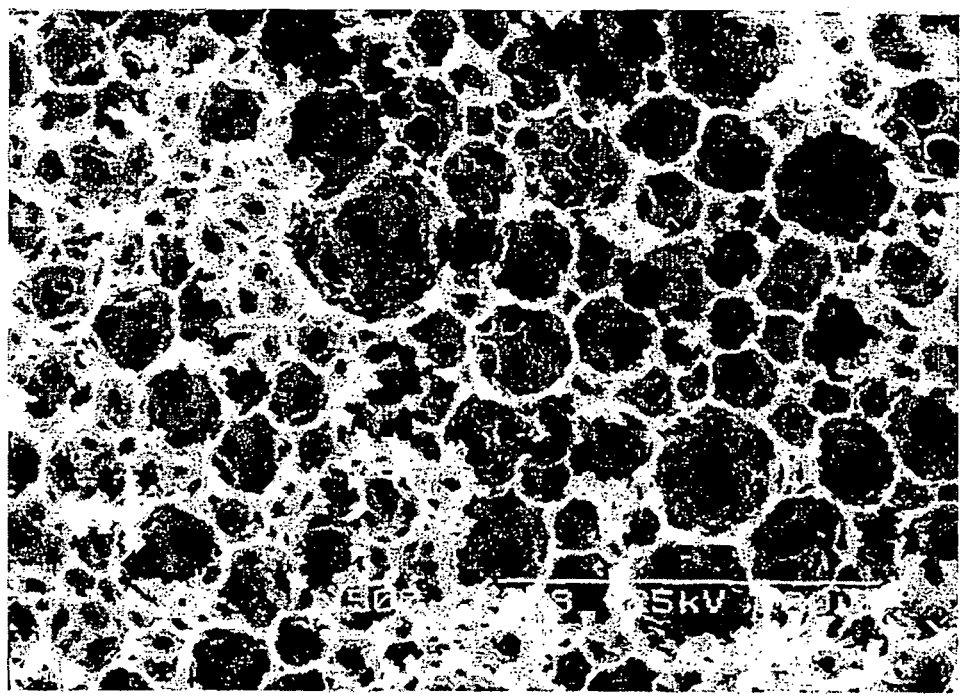
FIG. 1 shows SEM micrographs of hydrophobic rigid PHP, magnification 500.

For a better understanding of the present invention and to show how it may be carried into effect, reference shall now be made by way of example to the accompanying drawings, comprising FIGS. 1 through to 21.

Batch experiments using powdered polyHIPE demulsifiers with fixed internal microstructure but varying chemistry and/or solid-surface properties were performed in relation to crude oil emulsions. In these experiments two types of emulsions are used. (1) The first type of emulsion contains, in addition to indigenous surfactants, nano-sized organo-metallic particles. (2) The second type of emulsions are based on crude oils with or without added surfactant. In (1), the kinetics of emulsification and the mechanism of demulsification were also investigated in detail. In (2) the mechanism of emulsification is not investigated in detail but the demulsification under high pressure has been investigated.

Highly stable water/oil emulsions (50% water) were prepared using a formulation given by industry. The emulsion is stabilised by organo-metallic nano-particles and indigenous surfactants formed during the emulsification process. These emulsions are stable for several years. When anionic (either in acid form or Na-salt) microporous polyHIPE polymer particles are added to this emulsion, the emulsion separates out upon standing giving three layers within a few minutes (typically 5 minutes). The top layer is the organic phase while the bottom layer is the aqueous phase. The middle layer, depending on the emulsion, can contain unbroken emulsion and/or the polyHIPE polymer particles. When these particles are analysed, they are found to be heavily filled with organometallic particles forming aggregates within the pores. The separation efficiency can approach 100% depending on the emulsion and the chemical composition of the micro-porous polyHIPE polymer. Effective demulsification requires ~5×10$^{-4}$ gram of polymer per gram of emulsion. The location of the polyHIPE demulsifier in the separated system is dependent on the density of the demulsifier which can be controlled as necessary.

Several water-in-crude oil emulsions were prepared using two types of fresh crude oil Norsk Hydro). The aqueous phase contained 28.1 g/l NaCl; 0.45 g/l $CaCl_2$; and 5 g/l $MgCl_2 \cdot 6H_2O$. Both non-ionic and anionic surfactants were added if necessary in order to obtain an emulsion which is stable at least for five days. However, depending on the type of crude oil, some of the emulsions are stable for months even without the addition of emulsifier.

The separation dynamics of some of these emulsions (which separate within five days) were studied using static pressure at 200 bar in the absence or presence of $CO_2$. It was shown that the pressure accelerates the rate of separation by as much as 3 fold, while the presence of $CO_2$ does not have any significant effect. However, the rate of separation slowed down considerably after reaching ~80% separation within four days.

The effect of an electric field on the separation efficiency of the water-in-crude oil emulsions was also tested. An electric field (at 2 kV/cm) had no effect on highly stable emulsions (stable for more than three months) but gave approximately 50% separation after 20 minutes for the samples which yielded 80% separation within four days upon standing.

Even the highly stable emulsions yielded complete separation if a hydrophilic micro-porous polyHIPE polymer was used for demulsification. The demulsification was almost instantaneous and was found to reach up to 100%, and the phase disengagement took place under gravity. The phase disengagement could be enhanced by using well known techniques after demulsification. The efficiency of the phase separation increased with increasing temperature and decreasing oil phase viscosity. The separation efficiency of the process was less than ~3×10$^{-4}$ gram additive per gram of emulsion.

The oil-water separation with the polyHIPE demulsifier resulted in two layers. The bottom layer also contained the polyHIPE demulsifier which could be separated by filtration and reused. It was possible to ensure that all of the polyHIPE demulsifier was eventually located in the aqueous phase by ensuring correct density differentiation.

Another important aspect of the present technique was that the residual total organic carbon (TOC) in the aqueous phase was also reduced by a factor of 7 compared with gravity separation at atmospheric pressure.

TOC could be further reduced to insignificant levels by treating the aqueous phase with hydrophobic microporous polyHIPE polymer which could later be recovered and chemically changed to form the hydrophilic version for use as the demulsifier. The surface chemistry of the hydrophobic demulsifier could be changed to increase the selectivity in order to remove more toxic components from the residual oil in the water. Furthermore, heavy metal ions were also reduced during the demulsification process. Therefore, the aqueous phase could be discharged into the sea. The table below gives the TOC and metal ion concentrations (Mg and Ca) after various types of treatment.

With reference to the demulsification and/or separation of IFC, a model IFC was prepared and subjected to demulsification in both batch and continuous modes.

Batch mode demulsification was performed in measuring cylinders of 50 ml capacity. Predetermined volumes of the model IFC samples were taken from a well shaken stock bottle into the cylinder, which will be referred as a tube hereafter, and allowed to settle down overnight. The volumes of the aqueous phase (if present), emulsion (IFC), and organic phase (if present) were recorded prior to shaking the content with a vortex generator for 2 minutes. These volumes were taken as the initial phase volumes. A predetermined mass of polyHIPE material was then added into the tube and shaken for a further 2 minutes. Following the final shaking, the volumes of the three phases were recorded at predetermined intervals over a time period until a measured separation curve reached a plateau. These volumes were taken as the final phase volumes. The initial and the final values were used in to calculate a demulsification capacity, D, defined as:

$$D = \frac{[V_{aq}]_l - [V_{aq}]_i}{[M_{PHP}]}$$

where $V_{aq}$ is the volume of the aqueous phase and $M_{PHP}$ the mass of the PHP particles. Indices i and I denote initial and final, respectively. The reason for using the volume of the aqueous phase in calculating the demulsification capacity is that it is easier to determine more accurately than those of the IFC phase, which most of the time contains the polyHIPE particles as well as the organic phase.

Samples of raw IFC and those of remaining IFC after demulsification were analysed by a scanning electron microscope equipped with an energy dispersive analysis with x-ray (EDAX) instrument (Oxford ISIS system). Some of the polyHIPE particles were removed from the test tubes and were subjected to the same analysis. Some demulsification tests were performed with the remaining IFC from the first demulsification tests. Again both the IFC and polyHIPE particles were analysed by SEM/EDAX. The samples of the IFC and the polyHIPE particles used in SEM/EDAX analysis were prepared by drying them in an oven at 60° C. until all the liquid contents were removed.

Experiments have been conducted to clean the degraded solvent as well as the spent aqueous phase by using different types of polyHIPE materials and some other commercially available ion exchange resins and adsorbents (for a list see Table 2). Predetermined volumes of the degraded solvent and the spent aqueous phases were taken into separate test tubes to which were then added predetermined amounts of the cleaning agents. The tubes were shaken for predetermined periods of time and then were allowed to rest for predetermined periods of time. When all the solids had sedimented to the bottom of the tubes, liquids in the tubes were analysed visually with respect to their colours in comparison to their colours at the start. Aliquots of the liquid phases were chemically analysed for their heavy metal (mainly Pd), —COOH and TOC contents.

Figure 2:
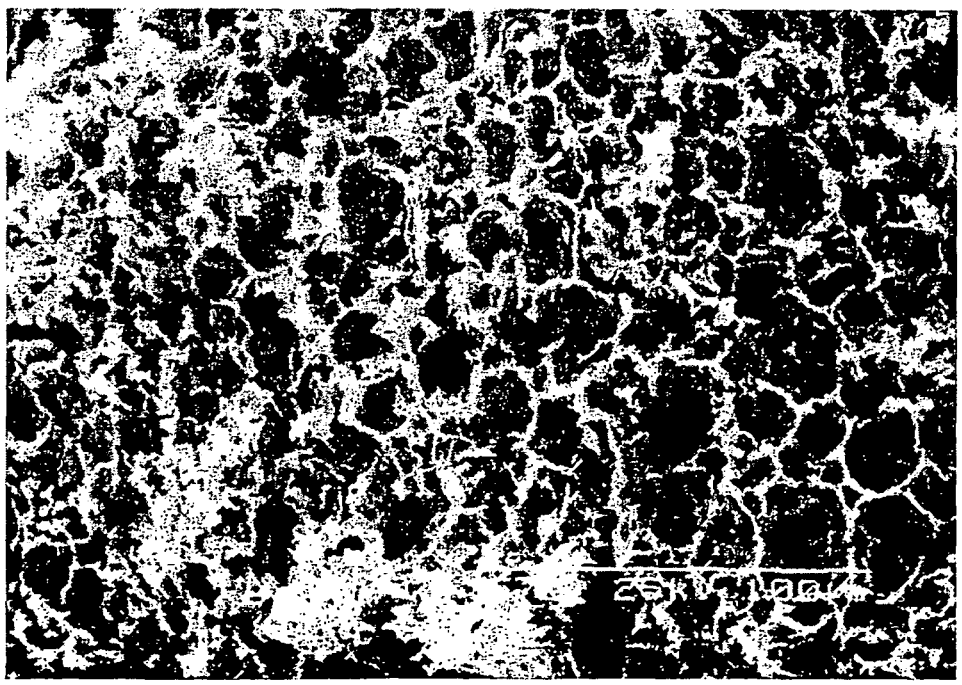
FIG. 2 shows SEM micrographs of a S-PHP, magnification 500.

Both rigid and elastic polyHIPE materials were prepared and a typical micrograph for a rigid polyHIPE is shown in FIG. 1. This figure shows the cellular structure of the polyHIPE material with the main cells interconnected by smaller windows in the cell walls. Sulphonated polyHIPE materials have been prepared with varying degrees of the sulphonation. Table 3 summarises the results of the sulphonation tests. The degree of the sulphonation seems to be a function of the particle size of the polyHIPE material, the temperature and the time. Sulphonation degrees of as high as 96% could be obtained by changing these factors. FIG. 2 shows a micrograph of a typical sulphonated polyHIPE material. It can be seen that during sulphonation, the polyHIPE structure is etched by the acid. This leads to the enlargement of the existing pores and formation of new smaller pores within the cell walls.

Figure 3A:
FIG. 3a shows SEM micrographs of hydrophilic (sulphonated) rigid PHP soaked in raw crud overnight, a lesser deposited region is shown, magnification 500.
Figure 3B:
FIG. 3b shows SEM micrographs of hydrophilic (sulphonated) rigid PHP soaked in raw crud overnight, magnification 2000.

Rigid polyHIPE cubes were soaked in IFC for two days under no external force or pressure. These polyHIPE samples were analysed by SEM. The micrographs indicated that IFC penetrated into the pores of the polyHIPE material and that the material was capable of retaining the solid particles and possibly also surface active dissolved degradation products. Some typical micrographs are shown in FIGS. 3a and 3b.

Figure 4:
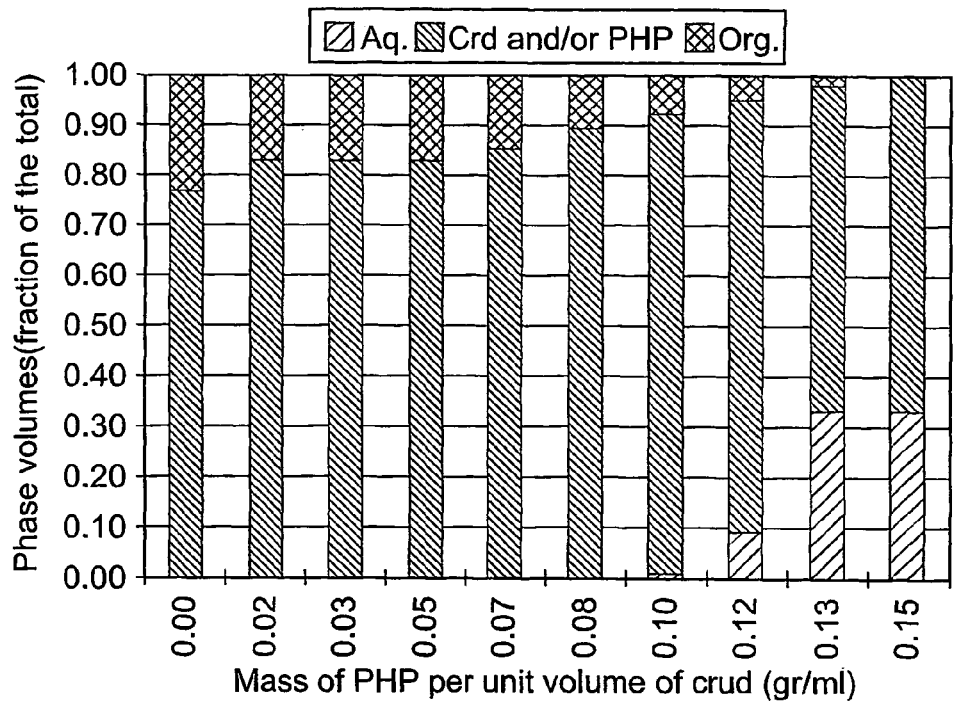
FIG. 4 shows performance of the original (hydrophobic) rigid PHP in the demulsification of the crude.

Test tube demulsification tests with rigid hydrophobic polyHIPE particles of size 1000 μm+250 μm demonstrated that polyHIPE could successfully break down IFC. Some typical results for a typical IFC type are shown in Table 4 as well as in FIG. 4.

Figure 5:
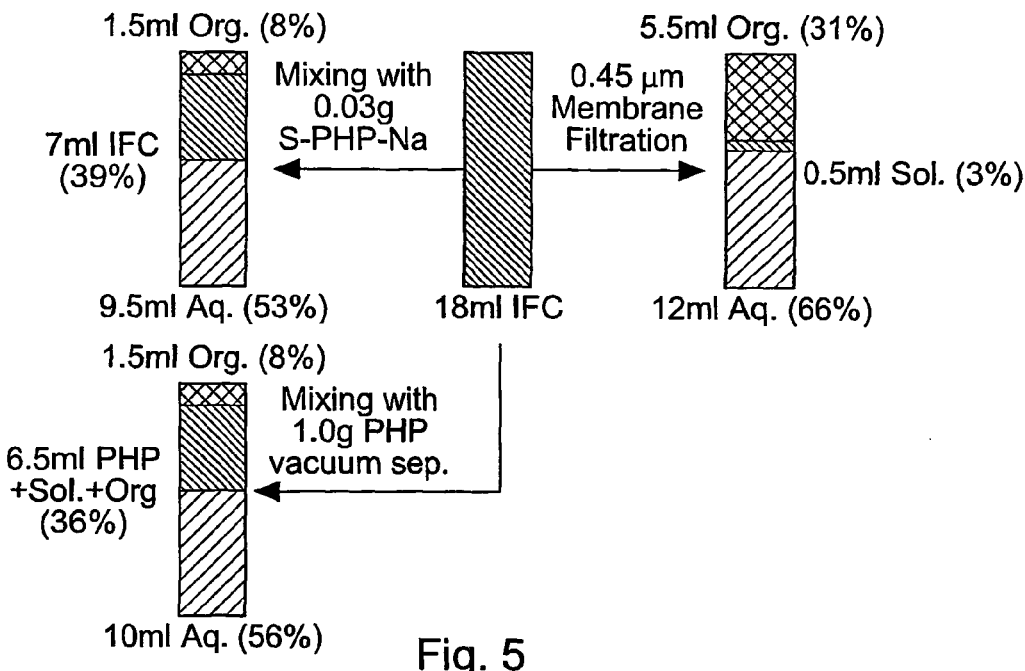
FIG. 5 shows comparison of the demulsification performance of PHP (hydrophobic and hydrophilic) with respect to that of 0.45 μm pore size membrane (total demulsification)

The results may be summarised as ($M_{pHp}$: mass of PHP in grams and $V_T$: the starting volume of raw IFC in cm$^3$ taken into the tubes):

For $M_{PHP}/V_T \cong 0.07$ no separation occurs.
For $0.07 \leq M_{PHP}/V_T < 0.12$ insignificant separation takes place.
For $M_{PHP}/V_T \geq 0.12$ significant separation occurs.
No organic phase remains for $M_{PHP}/V_T$ above 0.15.
For $M_{PHP}/V_T = 0.15$, the contents of a few tubes was taken into a separation funnel and the drainage from the funnel under gravity was collected in measuring cylinders. It was observed that no organic phase was released from the cellular structure of polyHIPE and all the liquids in which polyHIPE particles were suspended at the top were indeed aqueous phase. When a vacuum was applied, a small volume of organic phase with respect to that of the aqueous phase was also released. For a particular test with a different type of IFC of 18 ml volume mixed with 1.0 g polyHIPE, the volumes of the three phases, namely aqueous, organic, and solid (polyHIPE and absorbed material) were measured as 10 ml (56%), 1.5 ml (8%), and 6.5 ml (36%), respectively. This is schematically shown in FIG. 5 in comparison to the separation performance of sulphonated polyHIPE and that of a membrane of 0.45 μm pore size. It is clear from the figure that only 27% of the available organic phase (1.5 ml out of 5.5 ml) is released from the cellular structure of polyHIPE under relatively low vacuum. It is expected that, if the level of the vacuum on the drain side of the funnel (or the pressure on the funnel side) is increased further, it may be possible to extract all of the available organic phase. This may also be achieved by a combined press-filter device.

Figure 6:
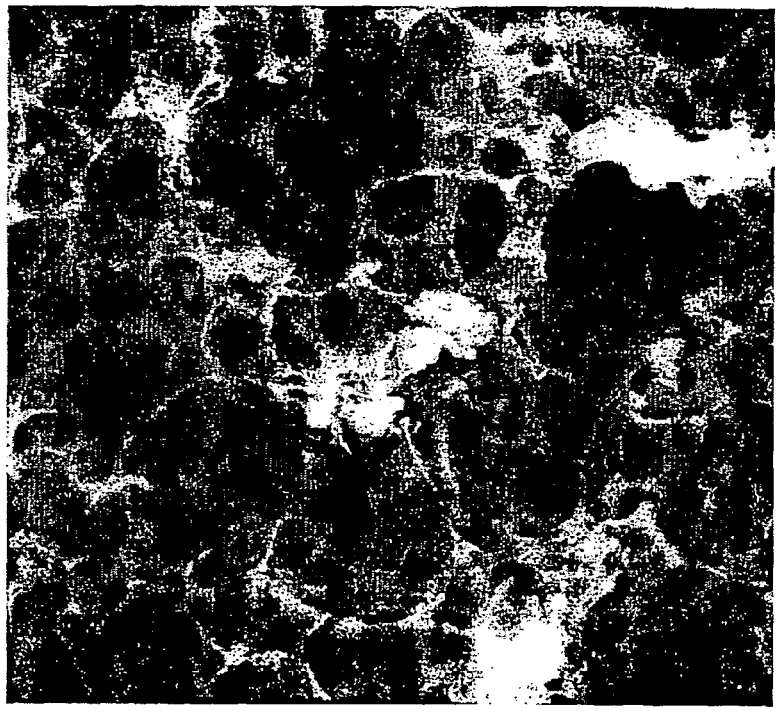
FIG. 6 shows PHP washed with methanol and then water after being used in demulsification.

Some polyHIPE pieces used in the demulsification was removed from the funnel and washed with ethanol followed by water. After drying they were analysed by SEM and a typical micrograph is shown in FIG. 6. In comparison to deposits displayed by the micrograph in FIG. 3, there is very little deposit in the cells of the polyHIPE shown in the micrograph of FIG. 6. This indicates that it may be possible to regenerate polyHIPE by a suitable and cheap solvent washing procedure. The solids may then also be separated from wash liquids by a suitable method.

Test tube demulsification experiments with a rigid hydrophilic sulphonated sodium salt of polyHIPE chopped into particles of size 1000 μm±250 μm size demonstrated that hydrophilic polyHIPE could successfully break down IFC. But in contrast to the hydrophobic polyHIPE, the smaller the amount of polyHIPE material used the better the separation was. For a particular test with 18 ml IFC mixed with 0.03 g sulphonated sodium salt of polyHIPE, the volumes of the three phases, namely aqueous, organic, and solid (polyHIPE and adsorbed material) were measured as 9.5 ml (53%), 1.5 ml (8%), and 7 ml (39%), respectively. This is schematically shown in FIG. 5 in comparison to the separation performance of untreated polyHIPE and that of a membrane of 0.45 μm pore size. When there was a separation, some sediments with the appearance of polyHIPE powders occurred in the aqueous phase. These sediments were mainly positioned at the bottom of the tubes but some remained suspended in the aqueous phase.

Figure 7:
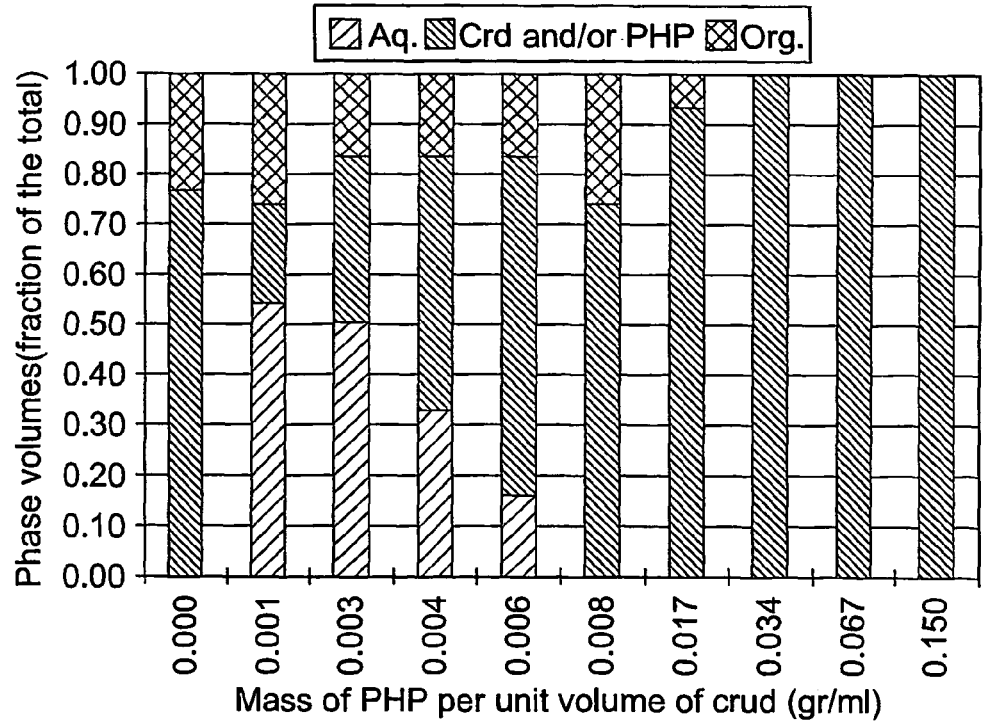
FIG. 7 shows performance of sulphonated (hydrophilic) rigid PHP in the demulsification of the crude.

The results obtained from a typical set of tests with a typical type of IFC are shown in Table 5 as well as in FIG. 7 which can be summarised as:

For $0.034 \leq M_{PHP}/V_T \leq 0.15$ rigid hydrophilic polyHIPE adsorbs everything, no separation occurs.
For $0.008 \leq M_{PHP}/V_T < 0.034$ no separation occurs, some free organic phase remains at the top.
For $M_{PHP}/V_T < 0.008$ separation occurs. The separation gets better for the smaller ratios.
For $M_{PHP}/V_T = 0.001$ significant separation occurs and it becomes better with decreasing $M_{PHP}/V_T$.

Figure 8A:
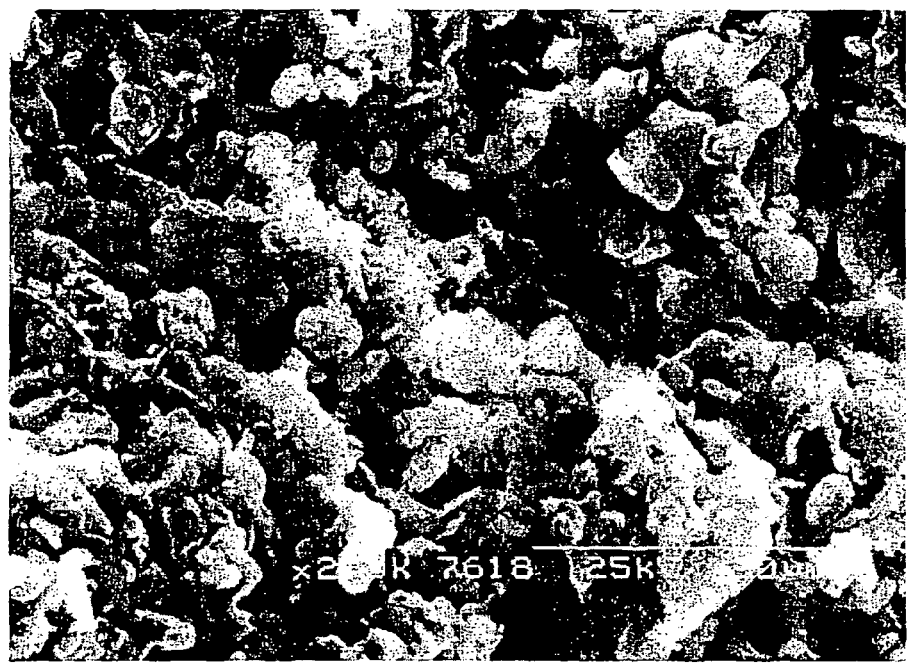
FIG. 8a shows SEM micrographs of the sediments formed in the aqueous phase during the demulsification of crud by hydrophilic PHP, magnification 2000.
Figure 8B:
FIG. 8b shows SEM micrographs of the sediments formed in the aqueous phase during the demulsification of crud by hydrophilic PHP, magnification 5000.
Figure 9A:
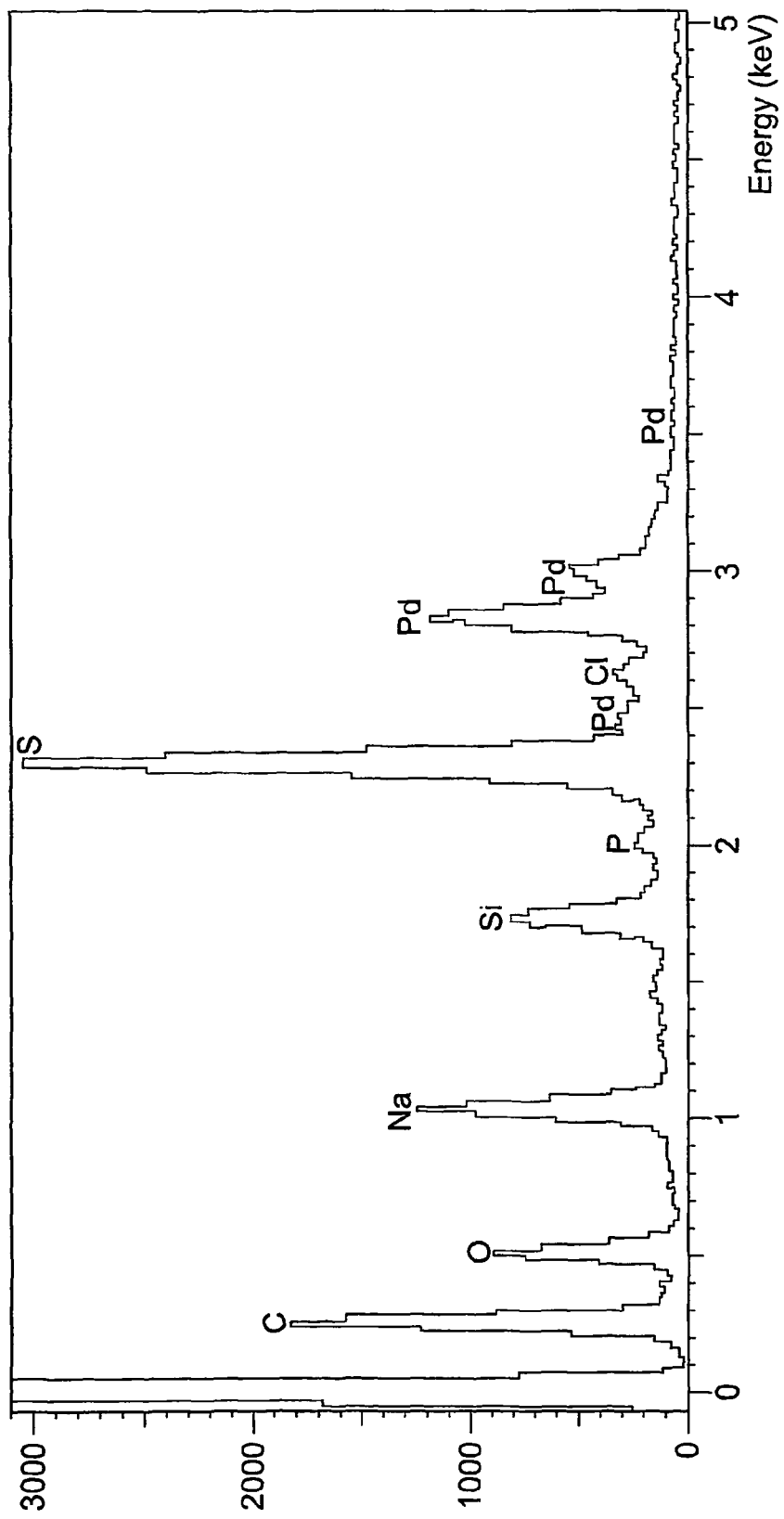
FIG. 9a shows EDAX spectrums of the sediments formed in the aqueous phase during the demulsification of crud by S-PHP-Na.
Figure 9B:
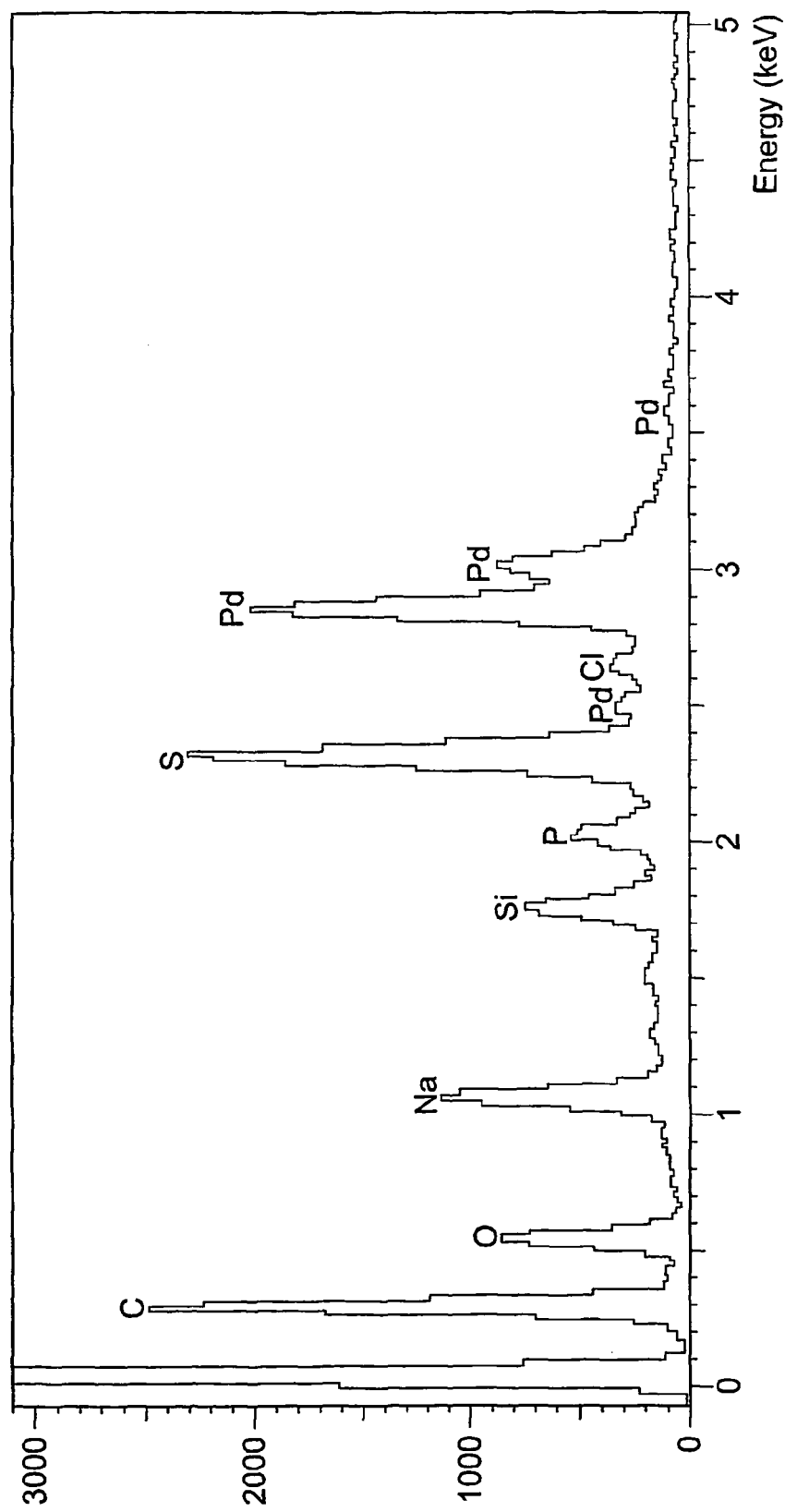
FIG. 9b shows EDAX spectrums of the sediments formed in the aqueous phase during the demulsification of crud by S-PHP-Na.

The sediments in the aqueous phase, remaining IFC, and polyHIPE particles positioned in the IFC phase were analysed using SEM/EDAX FIGS. 8 and 9 respectively show typical micrographs and EDAX spectrum of the sediments. These micrographs show that small particulate material has been trapped in the cellular structure of the polyHIPE whereas larger particles have accumulated on the surface. These large particles may be (1) the IFC particles adsorbed by polyHIPE and sedimented with polyHIPE, (2) and/or the IFC particles which are not adsorbed by polyHIPE but sediment when polyHIPE demulsifies the IFC resulting in formation of the aqueous phase. An EDAX spectrum of the total area shown by micrograph in FIG. 8a is given in FIG. 9a, and that of a single IFC particle trapped in the a polyHIPE cell is given in FIG. 9b. These both indicate the presence of palladium in the sediments.

Figure 10A:
FIG. 10a shows SEM micrographs of the S-PHP-Na particles remained in the crud phase after the first demulsification, magnification of a particle.
Figure 10B:
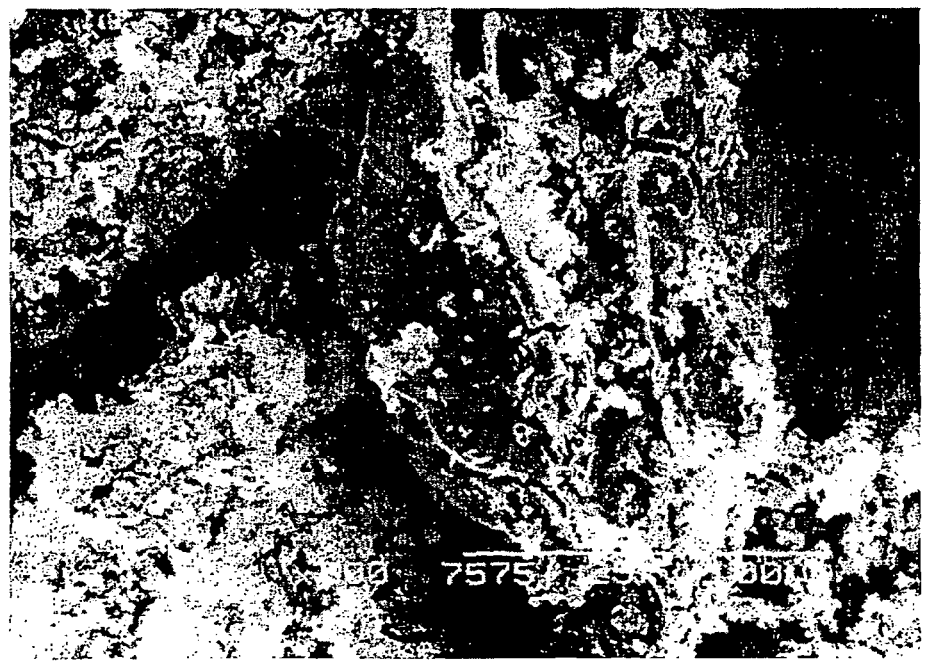
FIG. 10b shows SEM micrographs of the S-PHP-Na particles remained in the crud phase after the first demulsification, magnification of another particle.

FIGS. 10a and 10b show typical micrographs of polyHIPE particles remaining in the IFC. It is seen from the micrographs that these polyHIPE particles have very little porosity so that they are not able to adsorb IFC solids. Being lighter than the aqueous phase, they are positioned in the remaining IFC phase after demulsification.

Figure 13A:
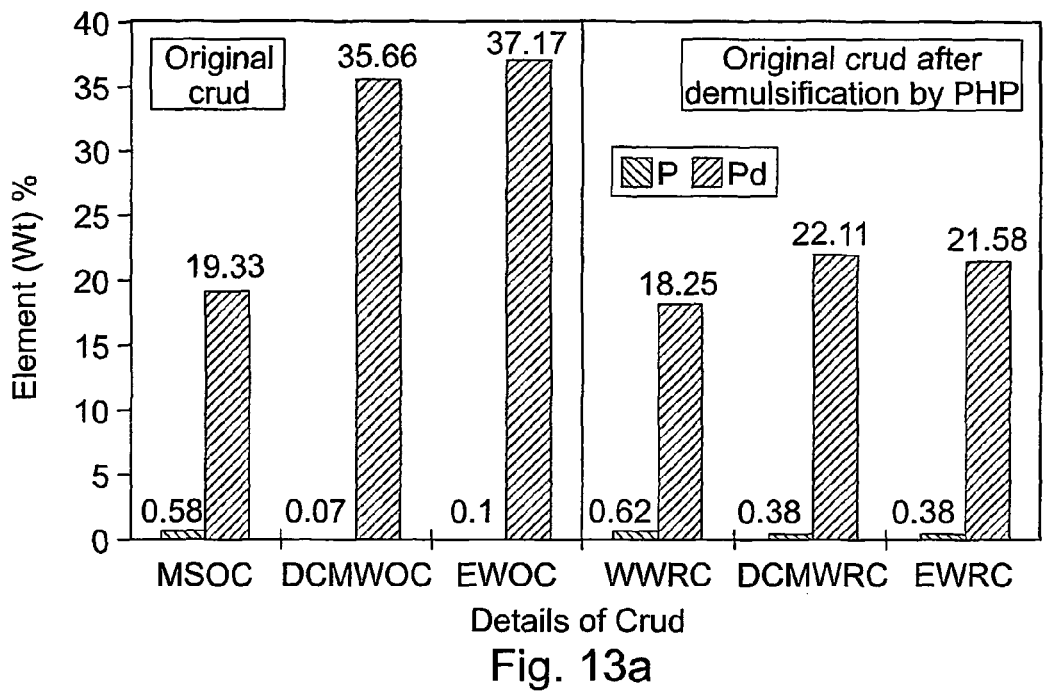
FIG. 13a shows chemical content of some typical crud solids, for palladium and phosphorous.
Figure 13B:
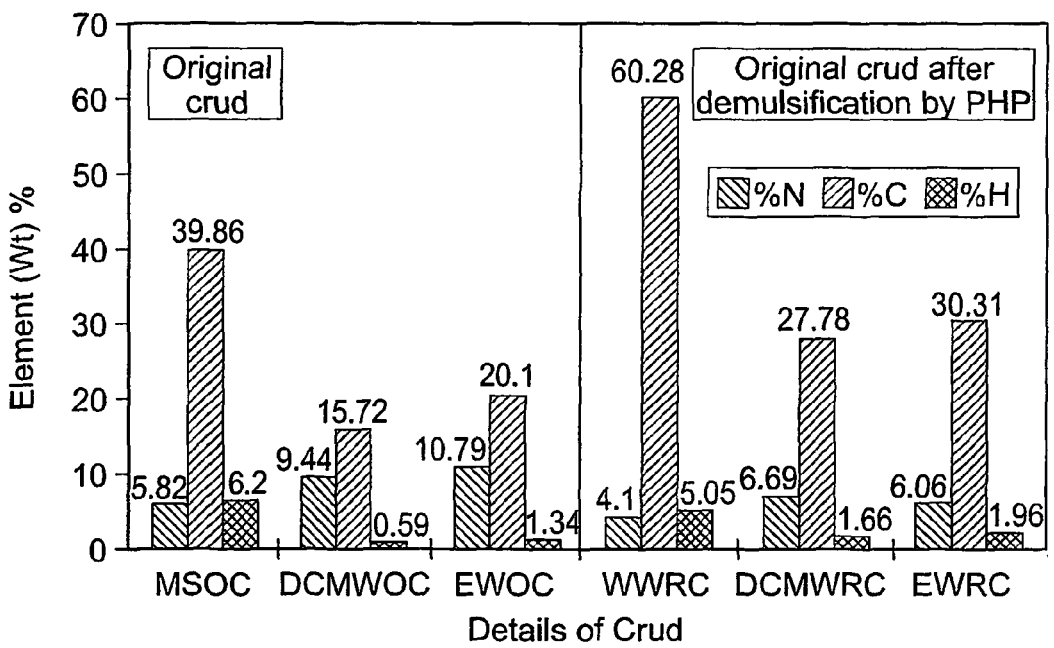
FIG. 13b shows chemical content of some typical crud solids, for nitrogen, carbon and hydrogen.

Some separate samples of remaining IFC solids were washed with water, ethanol, and dichloromethane followed by hexane to remove any TBP and OK residue which may have remained on the solids and dried. These washed remaining solids were analysed by SEM/EDAX as well as by chemical methods for their C, H, N, Pd and P content. Some typical micrographs and X-ray spectrums are given in FIGS. 11a and 12a for the samples washed with water, FIGS. 11b and 12b for the samples washed with ethanol and FIGS. 11c and 12c for the samples washed with dichloromethane and hexane. Chemical analysis results for these same samples are given in Table 6 as well as shown in FIG. 13. As for the original IFC the micrographs indicate that the remaining IFC solids are also in the form of sharp edged disc-shaped particles. These particles again remain in bulk either as individual particles and/or form agglomerates. The EDAX spectra of FIG. 12 indicate the presence of palladium in the remaining IFC.

Figure 14A:
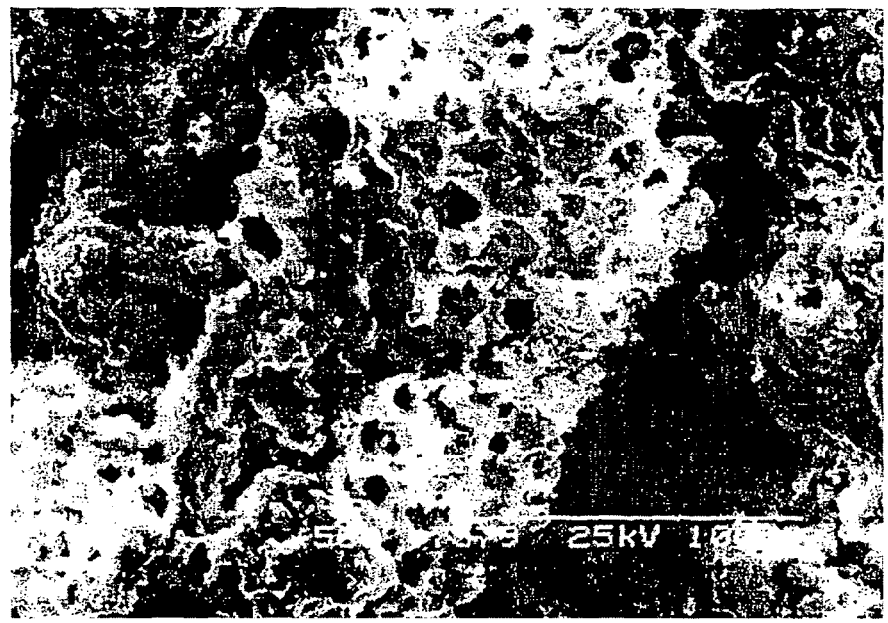
FIG. 14a shows SEM micrographs of the hydrophilic PHP particles remained in the crud phase after demulsification of the remaining crud from the first demulsification, magnification 500.
Figure 14B:
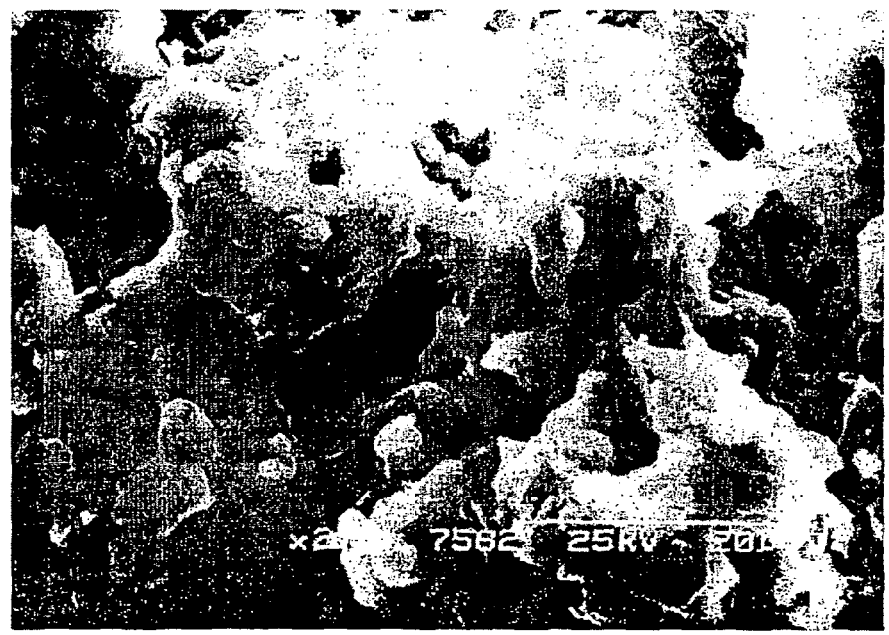
FIG. 14b shows SEM micrographs of the hydrophilic PHP particles remained in the crud phase after demulsification of the remaining crud from the first demulsification, magnification 2000.

Some detailed demulsification tests were performed to investigate the demulsification of the remaining IFC from the first demulsification test by using both plain polyHIPE and a sulphonated sodium salt of polyHIPE, as well as a combination of the two. In these tests both the type of IFC as well as the ratios of polyHIPE mass/IFC volume were changed. It was observed that the plain polyHIPE did not cause any further demulsification and polyHIPE itself did not undergo any changes. The sulphonated sodium salt of polyHIPE on the other hand seemed to be absorbing the remaining IFC without causing any further phase separation. In contrast to the first demulsification, the colours of the particles of sulphonated sodium salt of polyHIPE changed into that of the IFC becoming dark brownish-black coloured. These sulphonated sodium salt of polyHIPE particles were analysed by using SEM/EDAX. FIG. 14 shows typical micrographs of these sulphonated sodium salt of polyHIPE particles. It is seen that the cell walls and pores of these sulphonated sodium salt of polyHIPE particles have heavily been plastered by very fine IFC solids which appear to be smaller than those absorbed initially. Furthermore, these particles are more rounded, probably indicating the presence amorphous organics. These results indicates that the polyHIPE is capable of partially demulsifying IFC by removing only certain agents stabilising the IFC. Other means may have to be developed for the demulsification of the remaining IFC following the first partial demulsification by the sulphonated sodium salt of polyHIPE.

Figure 15A:
FIG. 15a shows SEM micrographs of very fine crud particles, magnification 500.
Figure 15B:
FIG. 15b shows SEM micrographs of very fine crud particles, magnification 5000.
Figure 16A:
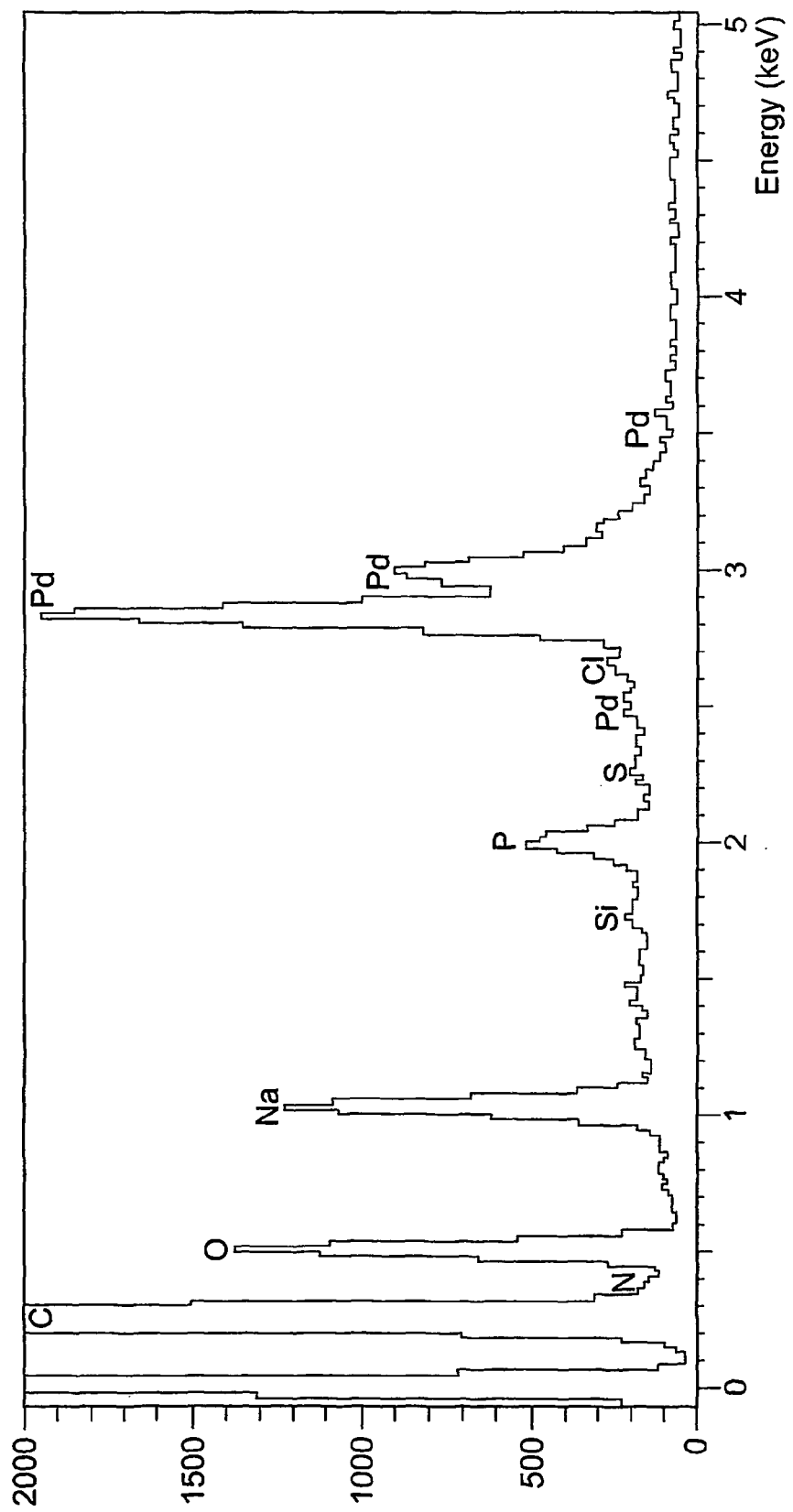
Figure 16B:
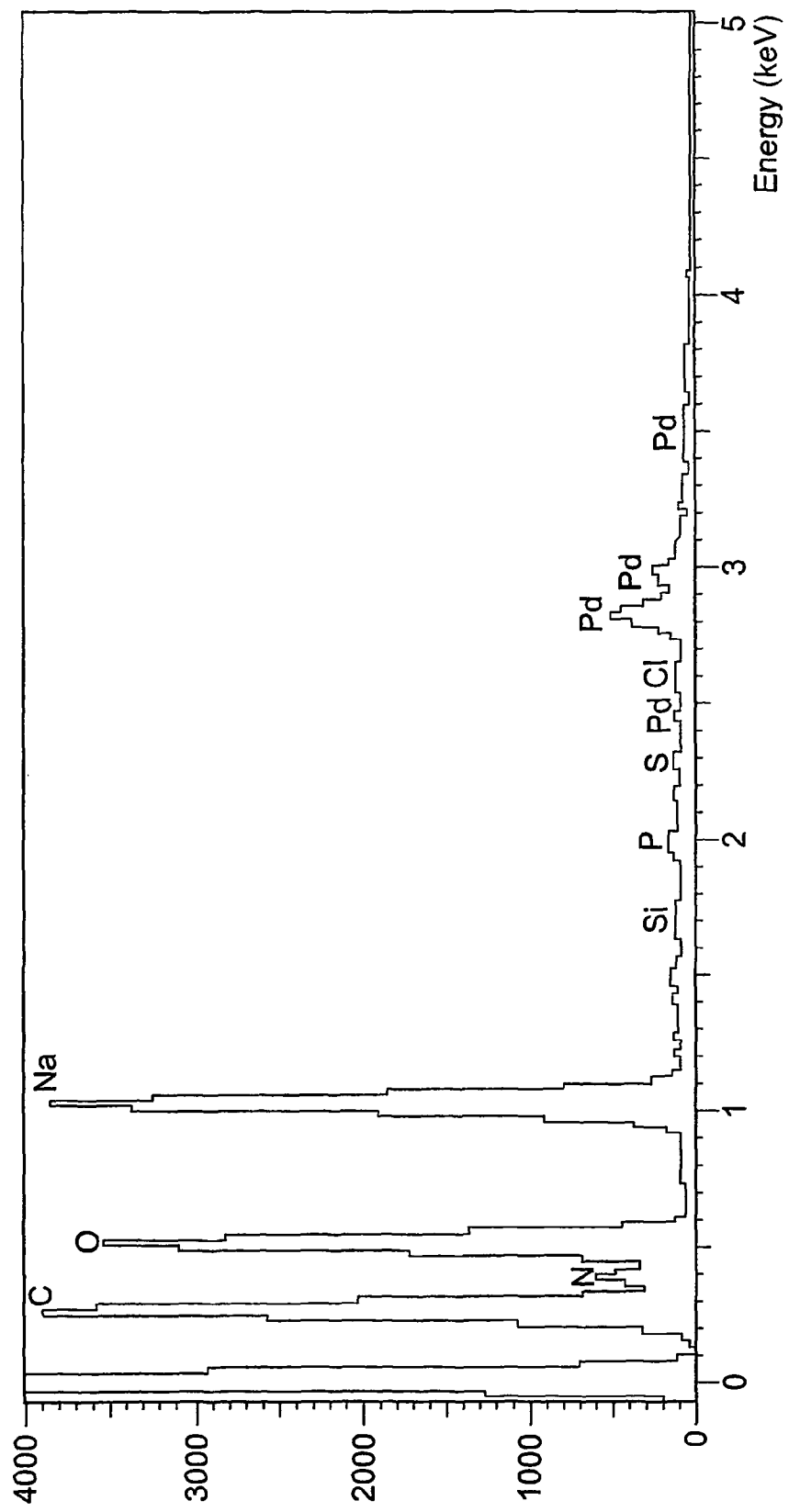

Some very fine particles from IFC remained on the top of the polyHIPE layer in the organic phase after re-demulsification. These fine particles were easily dispersed into the solvent phase with slight movement of the tubes. They were also analysed by using SEM/EDAX and typical micrographs and EDAX spectra are shown in FIGS. 15 and 16, respectively. Micrographs show that the disk-like shape of the original IFC particles are not observed here and that the fine IFC particles agglomerate into round-edged larger particles. FIG. 16a shows an enhanced P peak with respect to that of the Pd. FIG. 16b shows markedly low Pd and P peaks but a pronounced sodium peak indicating that it is mainly an organic material. An EDAX spectrum of the total area of the micrograph in FIG. 15a (i.e. FIG. 16a) shows the presence of a large quantity of palladium whereas the spectrum of the bright area in the same micrograph (i.e. FIG. 16b) indicates very little palladium. The spectrum of the dark region of the micrograph also showed a large quantity of palladium but less sodium than that of the total area. This and the bright white colour may indicate that the IFC is not only formed from palladium complexes of the degradation products but contains other components. Therefore, the solids in IFC may be in fact two types differentiated by the presence of the organics.

Effect of the particle size of the sulphonated sodium salt of polyHIPE on the demulsification was investigated for $M_{PHP}/V_T$=2.34 mg/l. The results are shown in Table 7.

It appears that the larger particles perform slightly better than the smaller particles. The amount of the sediments in the aqueous phase seemed to be the same size for all the polyHIPE particle fractions being investigated and they had the same appearance. The total amount of sediments and the amount of the suspended sediments got smaller with decreasing particle size. This observation indicated that the sediments might have not been only the polyHIPE particles but rather a mixture of the polyHIPE particles with solid products of the demulsification. This was checked by mixing the same amount of polyHIPE particles as above with a mixture of aqueous (15 ml) and organic phase (15 ml) only. It was observed that as soon as the polyHIPE particles came into contact with the liquid in the tube they started crumbling into much smaller particles as a result of differential swelling which induces internal stresses. These polyHIPE particles and those sedimented after the demulsification had the same appearance showing that the sediments were polyHIPE particles. In contrast to the sediments after the demulsification, the smaller particles here were positioned at the top of the aqueous phase. The reason for the particle sedimentation to the bottom of the tubes following the demulsification is that they become heavier as they bind the IFC solids in their cellular structure.

Figure 17:
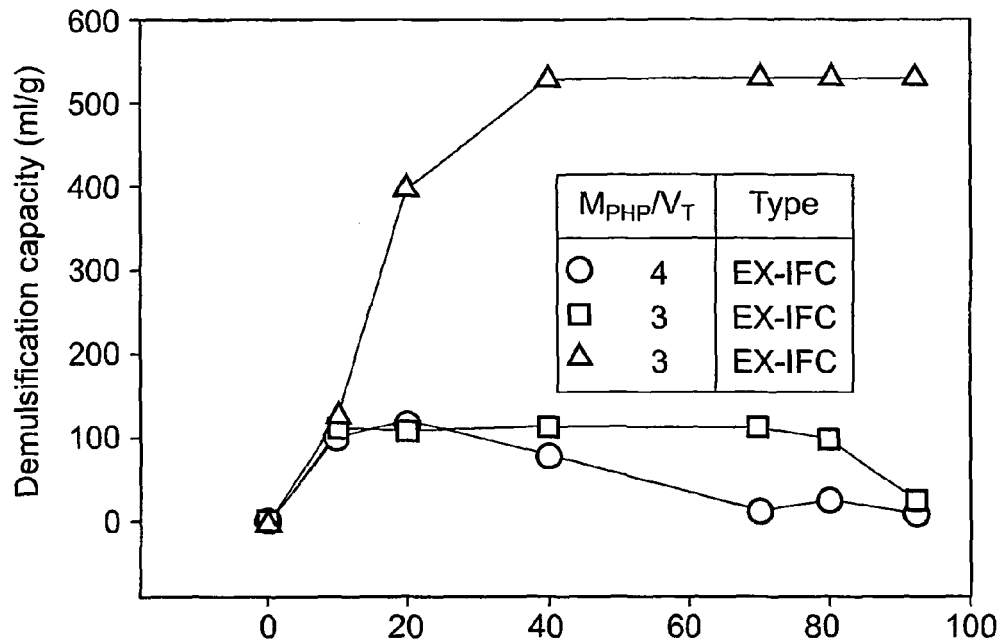
FIG. 17 shows the effect of the degree of the sulphonation for varying type of crud and the ratio of mass of PHP to the total volume of initial tube content ($M_{PHP}/V_T$)

The degree of the sulphonation of the polyHIPE represents its hydrophilic characteristics. The effect of the degree of the sulphonation on the demulsification was investigated with sulphonated sodium salt of polyHIPE particles of size 1000±250 μm size for varying types of IFC and the ratio of $M_{PHP}/V_T$ (in gram/l). For a typical type of IFC results are shown in Table 8. It appears that the degree of the sulphonation is important in the demulsification and that demulsification performance increases with increasing the degree of sulphonation up to a certain point beyond which the demulsification capacity remains unchanged with increasing degree of sulphonation. This data is shown in graph form in FIG. 17 (triangular symbol). Some more tests on the effect of the sulphonation degree have been performed for a different type of IFC and varying $M_{PHP}/V_T$. The results are given in Tables 9 and 10 as well as shown in FIG. 17. It seems that the demulsification capacity of a sulphonated polyHIPE with a given degree of sulphonation varies depending on the type of IFC. As the degree of the sulphonation becomes greater, polyHIPE becomes more hydrophilic in character and it holds a greater volume of aqueous phase in its cellular structure. Thus in effect a lesser amount of free aqueous phase separates and the separation capacity is decreased with increasing ratio of $M_{PHP}/V_T$.

The effect of neutralisation of the sulphonated polyHIPE on demulsification was investigated for different degree of the sulphonation with sulphonated sodium. salt of polyHIPE particles of size 1000±250 μm size and $M_{S-PHP-Na}/V_T$=mg/l. The results are shown in Table 11. The effect of the neutralisation can be evaluated by comparing the values of demulsification capacity (D) in this table, with that of sulphonated polyHIPE in Table 8. A careful inspection of these tables indicates that neutralisation does not significantly influence the demulsification performance of the sulphonated polyHIPE.

Figure 18:
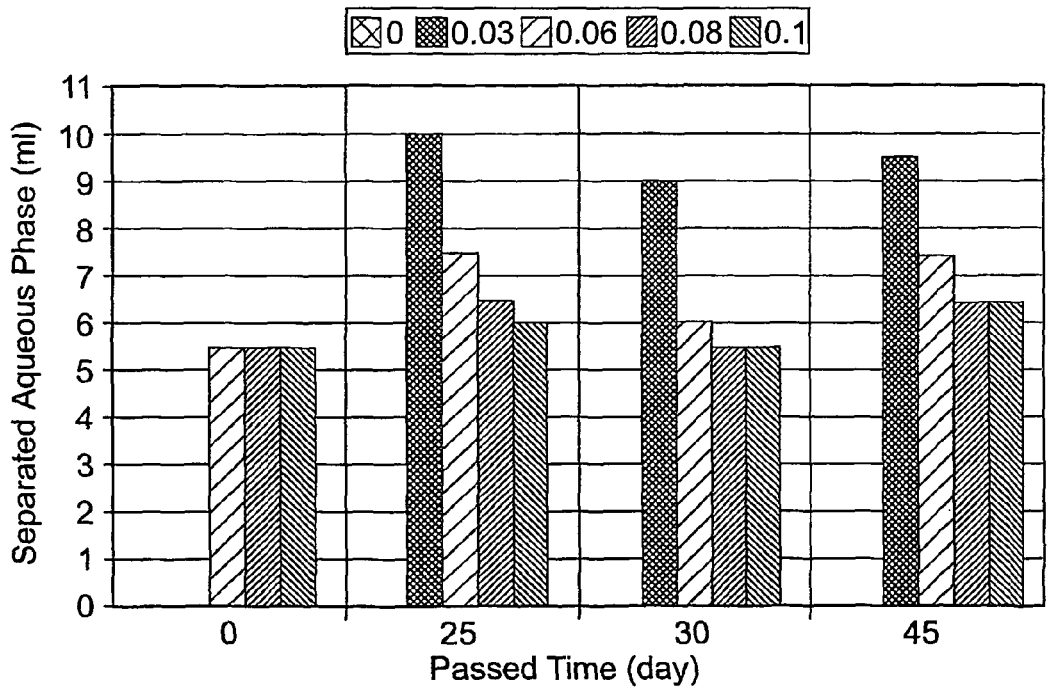
FIG. 18 shows the effect of S-PHP-Na mass on the aqueous phase separation as a function of time.
Figure 19:
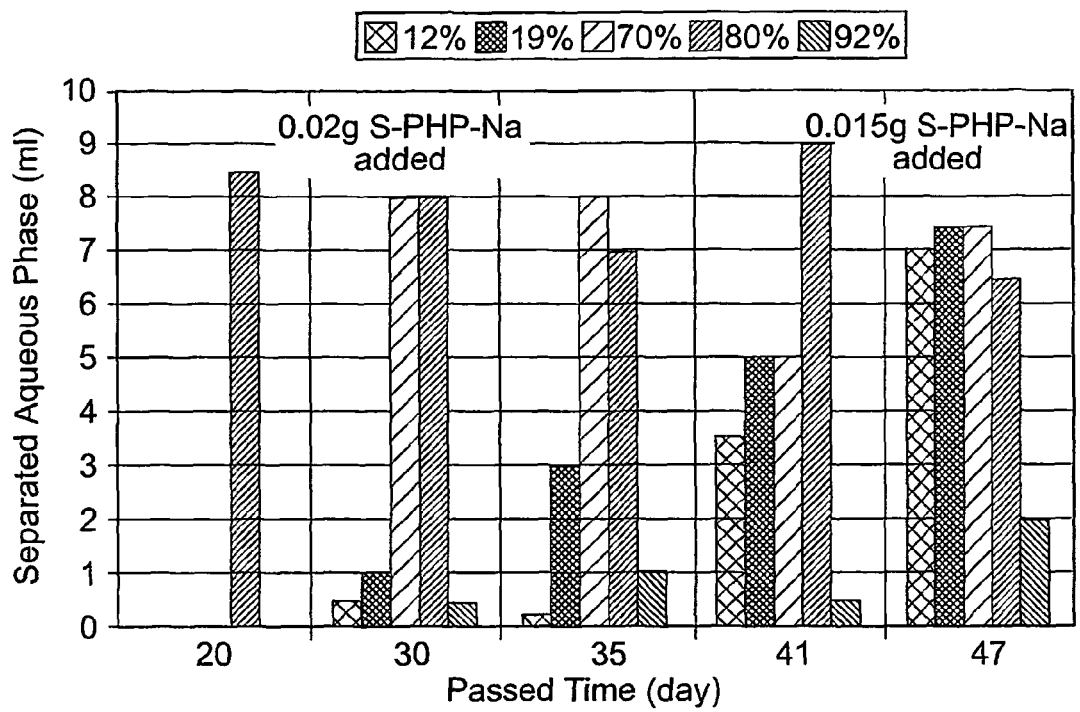
FIG. 19 shows the effect of the degree of the sulphonation as a function of time on the demulsification of crud.
Figure 20:
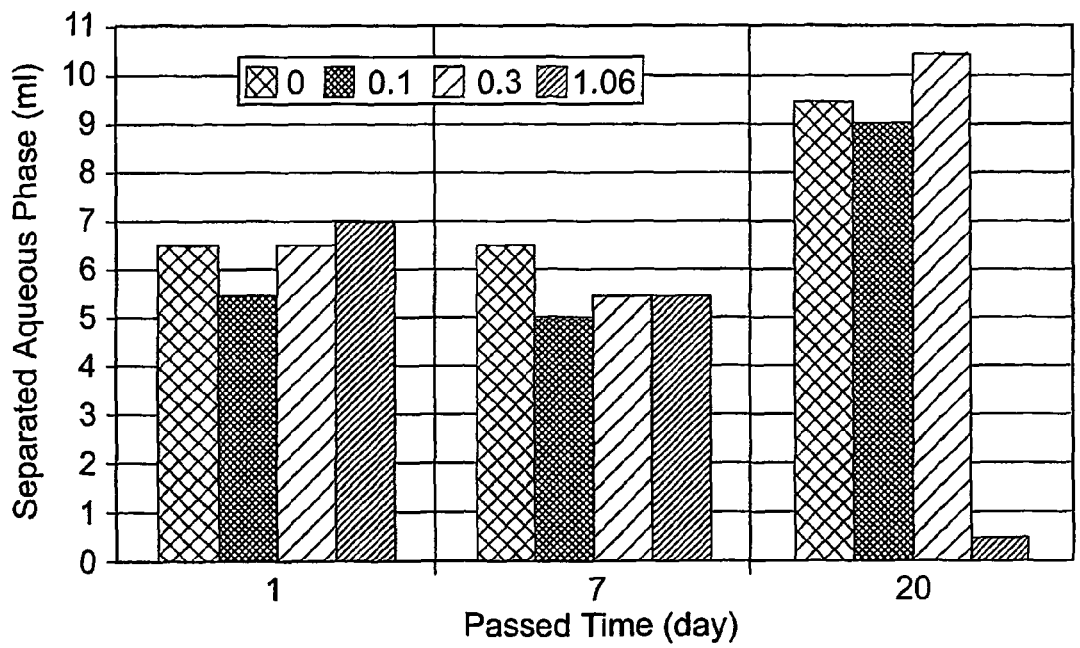
FIG. 20 shows the effect of mixture of S-PHP-Na and PHP as a function of time on the demulsification of crud.

The effect of the time passed from the first mixing and the subsequent mixings during this time period have been investigated for varying sulphonated sodium salt of polyHIPE mass ($M_{PHP}$). The results are shown in FIG. 18. It is seen from the figure that at first for $M_{PHP}$=0.03 g no separation occurs, but as the time passes it yields the highest separation of all. For $0.1 \geq M_{PHP} > 0.03$, the volume of the initially separated aqueous phase does not change much with $M_{PHP}$. This means that the separation capacity is higher for the smaller $M_{PHP}$ by virtue of its definition (see the equation above). After 25 days, subsequent shakings do not seem to be causing significant changes in the volumes of the separated aqueous phase for each mass of polyHIPE. It was observed that the demulsification performance for a given sulphonated sodium salt of polyHIPE changed not only depending on the type of the IFC (FIG. 17), as in the case of non-sulphonated PHP, but also depending on the time passed following the first mixing (FIG. 18). It seems that if a fast separation is required, then a smaller amount of sulphonated sodium salt of polyHIPE with a higher degree of sulphonation (40-80%) performs better as shown in FIG. 19. But if the separation time is not a concern, better separation performances can be achieved by allowing the mixture of sulphonated sodium salt of polyHIPE with a smaller degree of sulphonation and IFC to rest for longer periods. These results indicate that for a maximum separation performance important factors are (i) characteristics of the IFC, (ii) the degree of the sulphonation, (iii) the mass of the sulphonated sodium salt of polyHIPE, and (iv) the time passed from the first contact of sulphonated sodium salt of polyHIPE with IFC. It is to be noted that these factors affect the separation interactively; that is to say that they are interdependent. The effect of a mixture of rigid hydrophilic and rigid hydrophobic polyHIPE on the demulsification capacity has been investigated for a fixed mass of sulphonated sodium salt of polyHIPE (0.06 g) with varying mass of rigid hydrophobic polyHIPE (0 to 1.06 g). The results are shown in FIG. 20. For the first week the addition of hydrophobic polyHPE slightly decreases the separation performance. But as the time passes further, for 1.06 g hydrophobic polyHIPE addition, the separation is reduced dramatically (93%) with respect to its first day separation as well as to the case of no hydrophobic polyHIPE addition. A slight improvement (11%) in the separation is observed for 0.3 g hydrophobic PHP addition in the third week with respect to the case of no hydrophobic polyHIPE addition. The results indicate that in batch mode demulsification, a mixture of rigid hydrophilic and rigid hydrophobic polyHIPE does not cause any significant improvement in the separation performance but may yield dramatic reduction if the mass of the rigid hydrophobic polyHIPE is above a certain limit.

Elastic PHP as produced shows mainly hydrophobic and slightly hydrophilic surface characteristics. Only a few demulsification tests with elastic PHP were performed. The results indicated that elastic PHP was capable of yielding a demulsification capacity D=10 ml/g for a $M_{PHP}/V_T$ value as small as 16.7 mg/ml which is much better than the demulsification capacity of the rigid hydrophobic PHP(D=0.04 ml/g for $M_{PHP}/V_T$=83 mg/ml. But the performance of the elastic PHP was poorer than that of the hydrophilic PHP for which $M_{PHP}/V_T$ value as small as 1 mg/ml yields a demulsification capacity D=533 ml/g. This is thought to be due to the fact that hydrophilicity of the elastic PHP is higher than that of the original rigid PHP but smaller than that of the sulphonated rigid PHP.

Elastic polyHIPE particles were kept in concentrated sulphuric acid (98% by volume) overnight in an oven at 60° C. They were washed free of the acid and used in the demulsification of the IFC which gave a demulsification capacity the same as the original (see the above paragraph). Some of this sulphuric acid treated elastic polyHIPE was then kept in 2M NaOH overnight at room conditions. They were also tested for their demulsification capacities. The results showed that they were capable of yielding a demulsification capacity D=1 ml/g for a $M_{PHP}/V_T$=16.7 mg/ml which is ten times smaller than those of the original elastic polyHIPE and its sulphonated forms.

Some simple tests on continuous mode demulsification with different methods have been performed by using hydrophobic polyHIPE particles: (i) passing IFC through a polyHIPE packed bed with the aid of a peristaltic pump, and (ii) adding IFC to the top surface of a polyHIPE backed bed in a separation funnel and allowing it to drain under a relatively low vacuum. Both methods seemed to be effective in causing aqueous phase separation. But not much solvent phase separated due to the hydrophobic surface characteristics of the polyHIPE. For a typical test with a separation funnel it was possible to separate 84% of all the aqueous phase present in the IFC but only 18% of that of the solvent phase.

Figure 21:
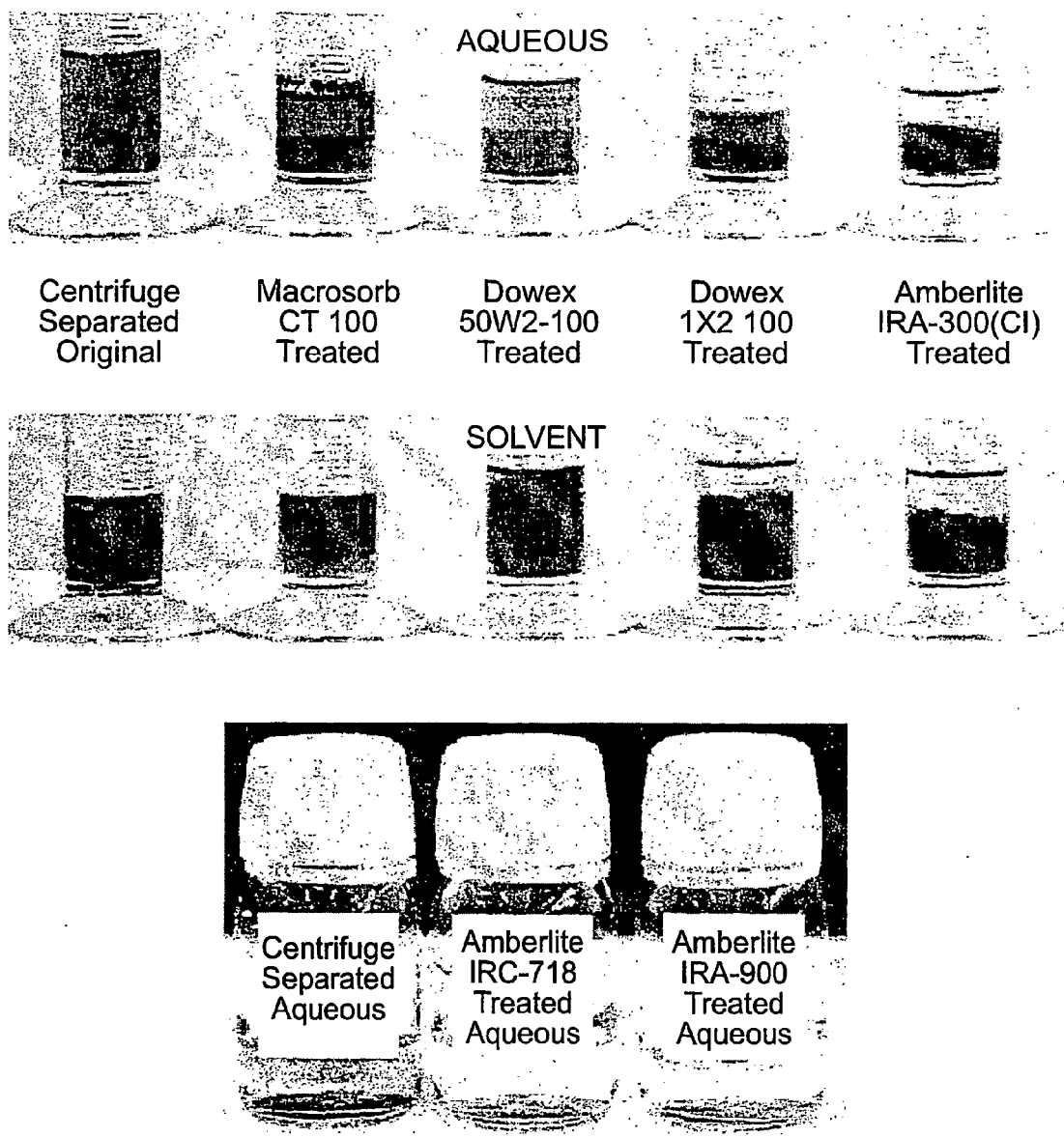
FIG. 21 shows some typical results of the tests on the treatment of degraded solvent phase and spent aqueous phase by commercially available absorbent and ion-exchange materials.

Efforts have been made to treat the degraded solvent phase as well as the spent aqueous phase in batch mode using test tubes. A large number of ion exchange resins as well as some absorbents including different types of polyHIPE have been tested. The results obtained are summarised in Table 2. The results given in Table 2 cover only physical observations. Some of the ion-exchange resins (Amberlite IRC-718, Amberlite IRA-900) caused excellent colour clarification both in the degraded solvent phase and in the spent aqueous phase. Some typical results are shown in FIG. 21. EDAX and chemical analysis of these samples indicated that Pd and P were reduced dramatically by these resins both in the solvent and the aqueous phases. The ion-exchange resins seem to be promising for the treatment of both the degraded solvent phase and the spent aqueous phase.

TABLE 1

TOC and metal concentration in the aqueous phase after separation under different conditions

| Description | TOC ppm | Mg ppm | Ca ppm |
|---|---|---|---|
| Aqueous phase only | 7 | 604 | 126 |
| Aqueous phase with demulsifier | 2 | 574 | 118 |
| Aqueous phase after demulsification | 28 | 530 | 109 |
| Aqueous phase after demulsification and treatment with hydrophobic polymer | 8 | 546 | 113 |
| Aqueous phase separated over a period of three months upon standing | 203 | — | — |
| Aqueous phase separated at 200 Bar after 100 hours | 120 | — | — |

TABLE 2

Summary of the performances of the materials used in IFC demulsification, degraded solvent treatment, and spent aqueous phase treatment.

| Material | IFC demulsification | Solvent treatment | Aqueous treatment |
|---|---|---|---|
| Cetco Europe Ltd. NT75/EA Flocculent | no phase separation | no colour changes | no colour changes |
| Cetco Europe Ltd. NT75/LSK-55 | no phase separation | no colour changes | no colour changes |
| Amberlite IRC-718 Ion-exchange resin | no phase separation | excellent colour clarification | excellent colour clarification |
| Amberlite IRA-900 Ion-exchange resin | no phase separation | excellent colour clarification | excellent colour clarification |
| Amberlite IRC-400(CI) Ion-exchange resin | no phase separation | colour clarification | very good colour clarification |

TABLE 2-continued

Summary of the performances of the materials used in IFC demulsification, degraded solvent treatment, and spent aqueous phase treatment.

| Material | IFC demulsification | | Solvent treatment | Aqueous treatment |
|---|---|---|---|---|
| Dovex 50WX2-100 Ion-exchange resin | no phase separation | | no colour changes | no colour changes |
| Dovex 1WX2-100 Ion-exchange resin | no phase separation | | colour clarification | colour clarification |
| Crosfield Textile Chemicals Macrosorb CT100 | no phase separation | | colour clarification | colour clarification |
| Paroxite Absorbents J-550 | no phase separation | | no colour changes | no colour changes |
| Paroxite Absorbents J-500 | Aqueous: Solvent: Initial IFC: | 2 ml 0 ml 22 ml | no colour changes | no colour changes |
| Paroxite Absorbents A-200 | Aqueous: Solvent: Initial IFC: | 14 ml 0 ml 22 ml | no colour changes | no colour changes |
| Hydrophilic PHP (S—PHP—Na) | Aqueous: Solvent: Initial IFC: | 16 ml 0 ml 22 ml | no colour changes | no colour changes |
| Hydrophobic PHP (PHP) | Aqueous: Solvent: Initial IFC: | 12 ml 0 ml 22 ml | no colour changes | no colour changes |
| Elastic PHP (EPHP) | Aqueous: Solvent: Initial IFC: | 5 ml 0 ml 22 ml | no colour changes | no colour changes |
| Carbonated PHP | no phase separation | | no colour changes | no colour changes |
| Activated Carbon | no phase separation | | colour clarification | colour clarification |

TABLE 3

Summary of the sulphonation test.

| Particle size (mm) | Temperature (° C.) | Time (hrs) | Degree of sulphonation (%) |
|---|---|---|---|
| −1 + 0.25 | 40 | 2 | 10 |
| −1 + 0.25 | 40 | 4 | 10 |
| −1 + 0.25 | 40 | 23 | 10 |
| −3* + 1 | 40 | 4 | 19 |
| 5* | 95 | 24 | 96 |
| 5* | 95 | 1 | 89 |
| 5* | 95 | 0.5 | 80 |
| 10* | 75 and 95 | 3 at 75° C. and 8 at 95° C. | 92 |
| 20* | 95 | 16 | 92 |
| 20* | room | 18 | 12 |
| 20* | 95 | 6 | 86 |
| 20* | 95 | 3.5 | 70 |

*Approximate

TABLE 4

Demulsification performance of rigid hydrophobic PHP.
Raw crud volume, $V_T$ = 30 ml, room conditions.

| Test No | $M_{PHP}$ (g) | $M_{PHP}/V_T$ (g/ml) | $[V_C]_i$ (ml) | $[V_C]_l$ (ml) | $[V_{aq}]_i$ (ml) | $[V_{aq}]_l$ (ml) | $[V_{or}]_i$ (ml) | $[V_{or}]_l$ (ml) | D (ml/g) |
|---|---|---|---|---|---|---|---|---|---|
| 1 | 0.0 | 0.0000 | 23.0 | 23.0 | 0.0 | 0.0 | 7.0 | 7 | 0.000 |
| 2 | 0.5 | 0.0167 | 24.0 | 26.5 | 0.0 | 0.0 | 6.0 | 5.0 | 0.000 |
| 3 | 1.0 | 0.0334 | 22.0 | 26.5 | 0.0 | 0.0 | 8.0 | 5.5 | 0.000 |
| 4 | 1.5 | 0.0500 | 21.5 | 26.7 | 0.0 | 0.0 | 8.5 | 5.8 | 0.000 |
| 5 | 2.0 | 0.0667 | 21.0 | 27.5 | 0.0 | 0.0 | 9.0 | 4.6 | 0.000 |
| 6 | 2.5 | 0.0834 | 20.0 | 28.8 | 0.0 | 0.1 | 10.0 | 3.3 | 0.040 |
| 7 | 3.0 | 0.1000 | 21.0 | 30.0 | 0.0 | 0.2 | 9.0 | 2.5 | 0.067 |
| 8 | 3.5 | 0.1167 | 21.5 | 28.7 | 0.0 | 3.0 | 8.5 | 1.7 | 0.857 |
| 9 | 4.0 | 0.1334 | 22.0 | 22.5 | 0.0 | 11.7 | 8.0 | 0.4 | 2.925 |
| 10 | 4.5 | 0.1500 | 22.0 | 23.7 | 0.0 | 11.7 | 8.0 | 0.0 | 2.600 |

TABLE 5

Demulsification performance of rigid hydrophilic PHP.
Raw crud volume, $V_T$ = 30 ml, room conditions.

| Test No | $M_{PHP}$ (g) | $M_{PHP}/V_T$ (g/ml) | $[V_C]_i$ (ml) | $[V_C]_l$ (ml) | $[V_{aq}]_i$ (ml) | $[V_{aq}]_l$ (ml) | $[V_{or}]_i$ (ml) | $[V_{or}]_l$ (ml) | D (ml/g) |
|---|---|---|---|---|---|---|---|---|---|
| 1 | 0.00 | 0.000 | 22.0 | 23 | 0.0 | 0 | 8.0 | 7 | 0 |
| 2 | 0.03 | 0.001 | 22.0 | 6 | 0.0 | 16 | 8.0 | 8 | 533 |
| 3 | 0.08 | 0.003 | 22.5 | 10 | 0.0 | 15 | 7.5 | 5 | 188 |
| 4 | 0.12 | 0.004 | 22.0 | 15 | 0.0 | 10 | 8.0 | 5 | 83 |
| 5 | 0.19 | 0.006 | 22.0 | 20 | 0.0 | 5 | 8.0 | 5 | 26 |
| 6 | 0.25 | 0.008 | 22.0 | 22 | 0.0 | 0 | 8.0 | 8 | 0 |
| 7 | 0.50 | 0.017 | 22.0 | 28 | 0.0 | 0 | 8.0 | 2 | 0 |
| 8 | 1.00 | 0.034 | 22.0 | 30 | 0.0 | 0 | 8.0 | 0 | 0 |
| 9 | 2.00 | 0.067 | 22.0 | 30 | 0.0 | 0 | 8.0 | 0 | 0 |
| 10 | 4.50 | 0.150 | 22.0 | 30 | 0.0 | 0 | 8.0 | 0 | 0 |

TABLE 6

Chemical analysis of the solids of a typical IFC. MSOC: Membrane Separated Original Crud, DCMWOC: Dicholoromethane Washed Original Crud, EWOC: Ethanol Washed Original Crud, WWRC: Water Washed Remaining Crud, DCMWRC: Dicholoromethane Washed Remaining Crud, EWRC: Ethanol Washed Remaining Crud.

| | Concentration (%) | | | | | |
|---|---|---|---|---|---|---|
| | ORIGINAL CRUD | | | REMAINING CRUD AFTER DEMULSIFICATION BY PHP | | |
| Element | MSOC | DCMWOC | EWOC | WWRC | DCMWOC | EWRC |
| Pd | 19.33 | 35.66 | 37.17 | 18.25 | 22.11 | 21.58 |
| P | 0.58 | 0.07 | 0.10 | 0.62 | 0.38 | 0.38 |
| C | 39.86 | 15.72 | 20.10 | 60.28 | 27.78 | 30.31 |
| H | 6.20 | 0.59 | 1.34 | 5.05 | 1.66 | 1.96 |
| N | 5.82 | 9.44 | 10.79 | 4.10 | 6.69 | 6.06 |
| Total | 71.79 | 61.46 | 69.50 | 88.30 | 58.24 | 60.29 |
| Others | 28.21 | 38.52 | 30.50 | 11.70 | 41.76 | 39.71 |

TABLE 7

The effect of the particle size on the demulsification.
$M_{PHP}/V_T$ = 2.34 mg/ml, room conditions.

| Test No | Particle Size (μm) | $[V_C]_i$ (ml) | $[V_C]_l$ (ml) | $[V_{aq}]_i$ (ml) | $[V_{aq}]_l$ (ml) | $[V_{or}]_i$ (ml) | $[V_{or}]_l$ (ml) | D (ml/g) |
|---|---|---|---|---|---|---|---|---|
| 1 | +1000 | 24 | 13 | 0.0 | 14 | 6 | 3 | 200 |
| 2 | −1000 + 710 | 23 | 13 | 0.0 | 13 | 7 | 4 | 186 |
| 3 | −710 + 500 | 23 | 13 | 0.0 | 13 | 7 | 4 | 186 |
| 4 | −500 + 250 | 23 | 13 | 0.0 | 13 | 7 | 4 | 186 |
| 5 | −250 | 23 | 13 | 0.0 | 12 | 7 | 5 | 171 |

TABLE 8

The effect of the degree of the sulphonation on the demulsification. $M_{PHP}/V_T$ = 3 mg/ml, room conditions.

| Test No | Degree of Sulphonation (%) | $[V_C]_i$ (ml) | $[V_C]_l$ (ml) | $[V_{aq}]_i$ (ml) | $[V_{aq}]_l$ (ml) | $[V_{or}]_i$ (ml) | $[V_{or}]_l$ (ml) | D (ml/g) |
|---|---|---|---|---|---|---|---|---|
| 1 | 0 | 24 | 26 | 0 | 0 | 6 | 5 | 0 |
| 2 | 10 | 23 | 19 | 0 | 5 | 7 | 7 | 125 |
| 3 | 20 | 23 | 14 | 0 | 16 | 7 | 1 | 400 |
| 4 | 40 | 22 | 6 | 0 | 16 | 8 | 8 | 533 |
| 5 | 92 | 23 | 6 | 0 | 16 | 7 | 8 | 533 |
| 6 | 92 | 23 | 6 | 0 | 16 | 7 | 8 | 533 |
| 7 | 92 | 23 | 6 | 0 | 16 | 7 | 8 | 533 |

TABLE 9

The effect of the degree of the sulphonation on the demulsification. $M_{PHP}/V_T$ = 3 mg/ml, room conditions. Oct. 27, 1998 Crud

| Test No | Degree of Sulphonation (%) | $[V_C]_i$ (ml) | $[V_C]_l$ (ml) | $[V_{aq}]_i$ (ml) | $[V_{aq}]_l$ (ml) | $[V_{or}]_i$ (ml) | $[V_{or}]_l$ (ml) | D (ml/g) |
|---|---|---|---|---|---|---|---|---|
| 1 | 0 | 17 | 18 | 0 | 0 | 3 | 2 | 0 |
| 2 | 10 | 17 | 10 | 0 | 7 | 3 | 3 | 108 |
| 3 | 20 | 17 | 8 | 0 | 7.5 | 3 | 4.5 | 115 |
| 4 | 40 | 17 | 11.5 | 0 | 7.5 | 3 | 2 | 115 |
| 5 | 70 | 17 | 10 | 0 | 7.5 | 3 | 3 | 115 |
| 6 | 80 | 17 | 10 | 0 | 6.5 | 3 | 3.5 | 100 |
| 7 | 92 | 17 | 14 | 0 | 2.0 | 3 | 4 | 31 |

TABLE 10

The effect of the degree of the sulphonation on the demulsification. $M_{PHP}/V_T = 4$ mg/ml, room conditions. Oct. 27, 1998 Crud

| Test No | Degree of Sulphonation (%) | $[V_C]_i$ (ml) | $[V_C]_l$ (ml) | $[V_{aq}]_i$ (ml) | $[V_{aq}]_l$ (ml) | $[V_{or}]_i$ (ml) | $[V_{or}]_l$ (ml) | D (ml/g) |
|---|---|---|---|---|---|---|---|---|
| 1 | 0 | 17 | 18 | 0 | 0 | 3 | 2 | 0 |
| 2 | 10 | 17 | 10 | 0 | 8 | 3 | 2 | 100 |
| 3 | 20 | 17 | 9 | 0 | 9.5 | 3 | 1.5 | 119 |
| 4 | 40 | 17 | 10.5 | 0 | 6.5 | 3 | 3.5 | 81 |
| 5 | 70 | 17 | 17 | 0 | 1 | 3 | 2 | 13 |
| 6 | 80 | 17 | 16 | 0 | 2 | 3 | 2 | 25 |
| 7 | 92 | 17 | 16 | 0 | 1 | 3 | 3 | 13 |

TABLE 11

The effect of the neutralisation of the sulphonated PHP on the demulsification. $M_{PHP}/V_T = 3$ mg/ml, room conditions.

| Test No | Degree of Sulphonation (%) | $[V_C]_i$ (ml) | $[V_C]_l$ (ml) | $[V_{aq}]_i$ (ml) | $[V_{aq}]_l$ (ml) | $[V_{or}]_i$ (ml) | $[V_{or}]_l$ (ml) | D (ml/g) |
|---|---|---|---|---|---|---|---|---|
| 1 | 0 | 24 | 26 | 0 | 0 | 6 | 5 | 0 |
| 2 | 10 | 22 | 17 | 0 | 5 | 8 | 8 | 125 |
| 3 | 20 | 22 | 12 | 0 | 15 | 8 | 3 | 375 |
| 4 | 40 | 22 | 6 | 0 | 16 | 8 | 8 | 533 |

The invention claimed is:

1. A method of demulsifying and/or separating an oil/water emulsion, comprising the steps of:
   i) supplying the emulsion to a rotating surface of a rotating surface reactor;
   ii) operating the rotating surface reactor so that the rotating surface spins at a speed sufficient to cause the emulsion to spread over the rotating surface as a continuously flowing thin film;
   iii) contacting the emulsion on the rotating surface with a polymerised High Internal Phase Emulsion (polyHIPE) material having a microcellular highly porous structure so as to cause demulsification and/or separation of the emulsion and wherein the polyHIPE material is in powder or granular form.

2. A method according to claim 1, wherein the oil/water emulsion is a crude oil emulsion.

3. A method according to claim 1, wherein the oil/water emulsion is interfacial crud (IFC).

4. A method according to claim 1, wherein the polyHIPE material is a rigid polyHIPE material.

5. A method according to claim 1, wherein the polyHIPE material is an elastic polyHIPE material.

6. A method according to claim 1, wherein the polyHIPE material is a hydrophobic polyHIPE material.

7. A method according to claim 1, wherein the polyHIPE material is a hydrophilic polyHIPE material.

8. A method according to claim 1, wherein the polyHIPE material is a sulphonated polyHIPE material.

9. A method according to claim 1, wherein the polyHIPE material is a sulphonated alkali salt of a polyHIPE material.

10. A method according to claim 1, wherein the polyHIPE material is a sulphonated sodium salt of a polyHIPE material.

11. A method according to claim 1, wherein the polyHIPE material is recovered and recycled after separation and/or demulsification of the oil/water emulsion.

* * * * *